United States Patent
Gonczi et al.

(10) Patent No.: US 11,086,701 B2
(45) Date of Patent: Aug. 10, 2021

(54) MASTER CONTROL PLANE FOR INFRASTRUCTURE AND APPLICATION OPERATIONS

(71) Applicant: Virtustream IP Holding Company LLC, Bethesda, MD (US)

(72) Inventors: Andrew J. Gonczi, Woodstock, GA (US); Kevin C. Harlan, Sandy Springs, GA (US); Chris Nakagaki, Atlanta, GA (US); Shivjit S. Patil, Chapel Hill, NC (US); Jeff Tomer, Pleasant Hill, CA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 136 days.

(21) Appl. No.: 16/256,247

(22) Filed: Jan. 24, 2019

(65) Prior Publication Data
US 2020/0241941 A1    Jul. 30, 2020

(51) Int. Cl.
*G06F 9/54* (2006.01)
*H04L 12/935* (2013.01)
(Continued)

(52) U.S. Cl.
CPC .......... *G06F 9/546* (2013.01); *H04L 9/3247* (2013.01); *H04L 9/3297* (2013.01);
(Continued)

(58) Field of Classification Search
None
See application file for complete search history.

(56) References Cited

U.S. PATENT DOCUMENTS 8,607,067 B1 * 12/2013 Janse van Rensburg ................... H04L 63/0823
713/189
8,683,560 B1 * 3/2014 Brooker .................. H04L 63/20
726/6

(Continued)

OTHER PUBLICATIONS

EMC Corporation, "VCE VXRack System 1000 Series: Hyper-Converged Infrastructure at Scale," The Virtual Computing Environment Company, EMC Converged Platforms, Feb. 17, 2016, 3 pages.

(Continued)

*Primary Examiner* — Umut Onat
(74) *Attorney, Agent, or Firm* — Ryan, Mason & Lewis, LLP

(57) ABSTRACT

An apparatus in one embodiment comprises a processing platform that includes a plurality of processing devices. The processing platform is configured to implement a master control plane and a plurality of messaging interfaces. Each messaging interface corresponds to one of a plurality of infrastructure controllers residing on an infrastructure under management by the processing platform. The master control plane is configured to communicate with each of the plurality of infrastructure controllers via the corresponding messaging interface. The plurality of infrastructure controllers are each configured to manage a corresponding one of a plurality of infrastructure components of the infrastructure under management. The master control plane is configured to communicate an instruction to a given infrastructure controller of the plurality of infrastructure controllers via the corresponding messaging interface and the given infrastructure controller is configured to modify the corresponding infrastructure component based at least in part on the communicated instruction.

20 Claims, 16 Drawing Sheets

(51) Int. Cl.
  *H04L 12/931*  (2013.01)
  *H04L 9/32*  (2006.01)
  *H04L 29/06*  (2006.01)

(52) U.S. Cl.
  CPC ...... *H04L 49/3018* (2013.01); *H04L 49/3027* (2013.01); *H04L 49/354* (2013.01); *H04L 63/0428* (2013.01); *G06F 2209/544* (2013.01); *G06F 2209/548* (2013.01)

(56) References Cited

U.S. PATENT DOCUMENTS

| | | | | |
|---|---|---|---|---|
| 9,237,155 | B1* | 1/2016 | Cavage | H04L 63/102 |
| 9,443,074 | B1* | 9/2016 | Janse Van Rensburg | H04L 67/1002 |
| 9,455,975 | B2* | 9/2016 | Brooker | G06F 21/44 |
| 9,733,960 | B2* | 8/2017 | Delamare | G06F 9/45533 |
| 10,097,531 | B2* | 10/2018 | Brooker | H04L 63/10 |
| 10,216,921 | B1* | 2/2019 | Janse Van Rensburg | H04L 67/1002 |
| 10,326,845 | B1* | 6/2019 | Jaeger | H04L 41/5019 |
| 10,338,945 | B2* | 7/2019 | Xiao | G06F 21/53 |
| 10,437,605 | B1* | 10/2019 | Jaeger | H04L 67/10 |
| 10,541,971 | B2* | 1/2020 | Glazemakers | H04L 63/0263 |
| 10,620,991 | B1* | 4/2020 | Lindner | G06F 9/5077 |
| 10,721,184 | B2* | 7/2020 | Cavage | G06F 9/5077 |
| 2002/0147854 | A1 | 10/2002 | Frazier et al. | |
| 2002/0174107 | A1 | 11/2002 | Poulin | |
| 2005/0147095 | A1* | 7/2005 | Guerrero | H04L 49/9042 370/390 |
| 2016/0094402 | A1 | 3/2016 | Finkelstein | |
| 2017/0012958 | A1* | 1/2017 | Brooker | G06F 21/44 |
| 2017/0295140 | A1* | 10/2017 | Glazemakers | H04L 12/4633 |
| 2018/0020008 | A1* | 1/2018 | Schoof | H04L 63/062 |
| 2018/0225135 | A1* | 8/2018 | Xiao | G05B 19/056 |

OTHER PUBLICATIONS sysdig.org, "Universal System Visibility with Native Container Support," 2015, 3 pages.
W. Felter et al., "An Updated Performance Comparison of Virtual Machines and Linux Containers," IBM Research Report, RC25482, Jul. 21, 2014, 15 pages.
EMC Corporation, "Vblock FastPath Desktop Virtualization Platform: Modernize Your Desktop with a Purpose-Built Desktop Virtualization Solution," The Virtual Computing Environment Company, vmware, 2011, 2 pages.
B. Hindman et al., "Mesos: A Platform for Fine-Grained Resource Sharing in the Data Center," Proceedings of the 8th USENIX Conference on Networked Systems Design and Implementation (NSDI), Mar.-Apr. 2011, pp. 295-308.
wordpress.com, "Virtustream xStream with App Director Service Module for SAP," The SAP Data Center of the Future, Apr. 14, 2016, 5 pages.
Solarwinds Worldwide, LLC, "Application Stack Management Bundle: Pinpoint the Root Cause of Application Problems in Seconds," http://www.solarwinds.com/application-server-management-software, 2016, 4 pages.
Zoho Corporation, "ManageEngine Applications Manager—Fact Sheet," https://download.manageengine.com/products/applications_manager/meam_fact_sheet.pdf, 2016, 4 pages.
The Apache Software Foundation, "Apache CloudStack: About," https://cloudstack.apache.org/about.html, 2016, 1 page.
Kaavo, "Application-Centric Cloud Resource Management," IMOD Data Sheet, http://docs.kaavo.com/Kaavo-IMOD-Fact-Sheet.pdf, 2011, 2 pages.
Morpheus Data, LLC, "Cloud Application Management for Today's Technology Leader," https://morpheus-v2-marketing-production.s3.amazonaws.com/system/SpudMedia/216/attachment/Morpheus_Overview_original.pdf, Jul. 8, 2016, 2 pages.
Rightscale, Inc., "RightScale Technical Overview," http://assets.rightscale.com/uploads/pdfs/RightScale-Technical-overview.pdf, 2014, 11 pages.
Activeeon, "ProActive Cloud Automation: Your Open Automation Platform, Product Sheet," http://www.activeeon.com/resources/activeeon-productsheet-proactive-cloud-automation-en.pdf, 2016, 2 pages.
VMware, "VMware vRealize Orchestrator: Executing Complex IT Operations Faster and at Lower Cost," Datasheet, https://www.vmware.com/content/dam/digitalmarketing/vmware/en/pdf/products/vrealize/vmware-vrealize-orchestrator.pdf, Sep. 2014, 2 pages.
The Apache Software Foundation, "The Theory Behind Brooklyn," https://brooklyn.apache.org/learnmore/theory.html, 2016, 4 pages.
The Apache Software Foundation, "Apache Provisionr," http://provisionr.incubator.apache.org/index.html, 2013, 1 page.
J. Cammarata, "About Cobbler," http://cobbler.github.io/about.html, 2016, 3 pages.
Canonical Ltd., "What is Juju?," https://jujucharms.com/docs/stable/about-juju, 2016, 6 pages.
SaltStack Inc., "SaltStack Orchestration & Automation for CloudOps, ITops & DevOps at Scale," https://saltstack.com/enterprise/, 2016, 3 pages.
Empirius GMBH, "Technical Whitepaper: BlueSystemCopy for SAP," http://empirius.de/en/products/blue-systemcopy-systemcopies-automatic-and-optimized.html, Aug. 2016. 17 pages.
Libelle AG, "Libelle SystemCopy: Automated and Optimized System Copies for SAP Applications," Fact Sheet, http://www.libelle.com/fileadmin/Public/Whitepaper/FactSheet_Libelle_SystemCopy_EN.pdf, Apr. 2015, 4 pages.
Cloud Foundry Foundation, "Cloud Foundry Overview," https://docs.cloudfoundry.org/concepts/overview.html, Jul. 27, 2016, 4 pages.
Heroku Dev Center, "How Heroku Works," https://devcenter.heroku.com/articles/how-heroku-works#defining-an-application, Aug. 26, 2016, 10 pages.
Apcera Inc., "How Apcera Works," http://docs.apcera.com/introduction/apcera-usage/, Nov. 4, 2015, 4 pages.
Kubernetes, "What is Kubernetes?," http://kubernetes.io/docs/whatisk8s/, 2016, 6 pages.
USHARESOFT, "UForge for Cloud Service Providers Scale. Differentiate. Make Money. Solution Sheet," https://www.usharesoft.com/resources/datasheets/uforge-cloud-providers.pdf, 2014, 2 pages.
Gigaspaces Technologies, "What is Cloudify?," http://docs/getcloudify.org/3.3.1/intro/what-is-cloudify/, 2016, 2 pages.
CLIQR Technologies, "CloudCenter Features," http://docs.cliqr.com/display/CCD42/Features, 2016, 2 pages.
Red Hat, Inc., "Ansible Tower User Guide v3.0.1," https://docs.ansible.com/ansible-tower/latest/html/userguide/overview.html, 2016, 3 pages.
Chef Software Inc., "CHEF" DataSheet, https://pages.chef.io/rs/255-VFB-268/images/chef-datasheet.pdf, Jun. 2016, 2 pages.
CFENGINE, "Introduction and System Overview," https://docs.cfengine.com/lts/guide-introduction.html, Sep. 28, 2016, 5 pages.
Incontinuum, "Automated Cloud Orchestration," http://incontinuum.incontinuumsoftw.netdna-cdn.com/wp-content/uploads/2016/07/CloudController-EN-1606-BROCHURE.pdf, Jun. 2016, 4 pages.
Apprenda Inc., "What is Apprenda, Logically Speaking?" http://docs.apprenda.com/print/book/export/html/976, 4 pages.
Fluid Operations AG, "Next Generation Cloud Management," https://www.fluidops.com/en/company/post?s=2016-03-30-new-paper-available-next-generation-cloud-management, Mar. 30, 2016, 12 pages.
VMware, Inc., "VMware vCloud Air: Service Description," Datasheet, http://www.vmware.com/content/dam/digitalmarketing/vmware/en/pdf/product/vcloud-air/vmware-vcloud-air-datasheet.pdf, 2015, 4 pages.
Red Hat, Inc., "Openshift Enterprise 3.1 by Red Hat," Datasheet, https://www.openshift.com/sites/default/files/rhc-openshift-enterprise-paas-datasheet.pdf, 2015, 2 pages.
IBM Corporation Software Group, "Simplifying Cloud Management and Data Center Automation," Thought Leadership White Paper, http://www-03.ibm.com/software/products/en/ibm-cloud-orchestrator, Apr. 2014, 6 pages.

(56) References Cited

OTHER PUBLICATIONS

Rackspace US, Inc., "Why Rackspace: More Than a Hosting Provider. We're your Trusted Service Partner," https://www.rackspace.com/why-rackspace, 2016, 6 pages.
Hashicorp, "DevOps and the Future of Infrastructure," https://www.hashicorp.com/index.html#products, 2016, 10 pages.
C3DNA Inc., "The C3DNA Platform," http://c3dna.com/product.html, 2014, 5 pages.
IT-Conductor Inc., "Application Performance Management as Service," http://itconductor.com/, 2016, 7 pages.
Elasticbox, "Adaptive Cloud Application Delivery," https://elasticbox.com/how-it-works, 2016, 5 pages.
Hashicorp, "Why Vagrant?," https://www.vagrantup.com/docs/why-vagrant/, Jan. 19, 2016, 3 pages.
Hewlett Packard Enterprise Development LP, "Eucalyptus 4.3.0 User Guide," https://docs.eucalyptus.com/eucalyptus/4.3.0/, Sep. 23, 2016, 127 pages.
Puppet, "Explore the Value of Puppet Enterprise," https://puppet.com/resources/data-sheet/explore-value-of-puppet-enterprise, 2016, 4 pages.
Rackspace US, Inc., "Welcome to the Heat Documentation!," OpenStack Heat, http://docs.openstack.org/developer/heat, 2013, 5 pages.
SAP, "Soft Shutdown in SAP Application Server," SAP NetWeaver 7.3 EHP1 Documentation, https://help.sap.com/saphelp_nw73ehp1/helpdata/en/f7/cb8577bc244a25a994fc3f9c16ce66/frameset.htm, Nov. 2016, 5 pages.
json-schema.org, "JSON Schema," http://json-schema.org/, 2007, 2 pages.
iana.org, "Link Relations," https://www.iana.org/assignments/link-relations/link-relations.xhtml, Oct. 26, 2017, 12 pages.
R. Fielding et al., "Hypertext Transfer Protocol—HTTP/1.1—Section 10—Status Code Definitions," Network Working Group, Request for Comments: 2616, Jun. 1999, 19 pages.
apache.org, "Apache Commons—Apache Commons," http://commons.apache.org/, Jun. 3, 2018, 4 pages.
Pivotal Software, Inc., "Spring One Platform," http://spring.io/, 2018, 6 pages.
raml.org, "RAML Version 1.0: RESTful API Modeling Language," https://github.com/raml-org/raml-spec/blob/master/versions/raml-10/raml-10.md/, retrieved Aug. 3, 2018, 69 pages.
saltstack.com, "Salt Proxy Minion," https://docs.saltstack.com/en/latest/topics/proxyminion/index.html, Aug. 3, 2018, 17 pages.
SAP Netweaver Server Infrastructure, "How to Use the SAPControl Web Service Interface," https://www.sap.com/documents/2016/09/0a40e60d-8b7c-0010-82c7-eda71af511fa.html, Oct. 21, 2016, 61 pages.
Oracle Enterprise Manager, "Enterprise Manager—Database as a Service—REST API Cookbook," http://www.oracle.com/technetwork/oem/cloud-mgmt/dbaas-api-cookbook-030116-2925990.pdf, Feb. 29, 2016, 30 pages.
Saltstack, Inc., "Salt Documentation—Release 2018.3.2," https://saltstack.com/, Jul. 16, 2018, 900 pages.
U.S. Appl. No. 15/669,608 filed in the name of Peter Jaeger filed Aug. 4, 2017, and entitled "Configurable Startup, Shutdown, Reboot and Isolation for Applications in Cloud-Based Information Processing Systems."
U.S. Appl. No. 15/195,159 filed in the name of Peter Jaeger filed Jun. 28, 2016, and entitled "Multi-Layer Application Management Architecture for Cloud-Based Information Processing Systems."

* cited by examiner

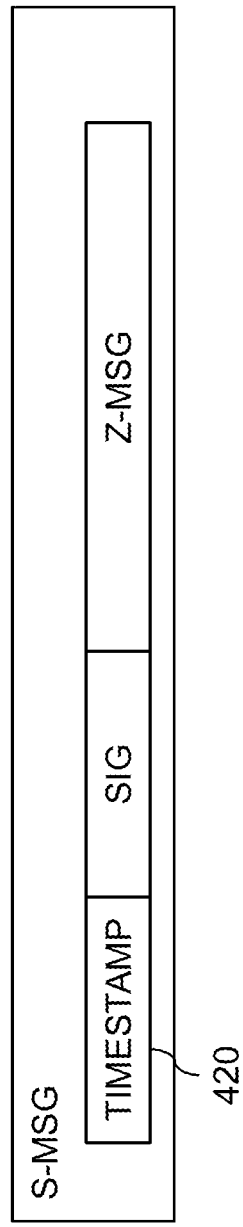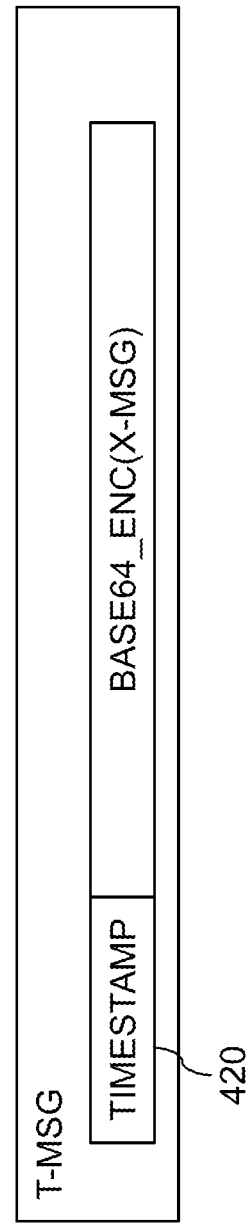

MASTER CONTROL PLANE FOR INFRASTRUCTURE AND APPLICATION OPERATIONS

FIELD

The field relates generally to information processing systems, and more particularly to techniques for managing applications in cloud-based information processing systems.

BACKGROUND

Advanced forms of information technology (IT) infrastructure, including but not limited to cloud computing platforms, converged infrastructure (CI) platforms, software defined data centers (SDDCs), distributed infrastructure, and other types of processing platforms, are increasing in availability and usage. Management of such IT infrastructure by users, such as customers, companies, businesses, organizations or other enterprises, is a complex task. As IT infrastructure expands and new platforms, software, and other IT resources are released and become available or incorporated into such IT infrastructure, the complex task of IT management is increasingly difficult and costly.

SUMMARY

In one embodiment, an apparatus comprises a processing platform that includes a plurality of processing devices each comprising a processor coupled to a memory. The processing platform is configured to implement a master control plane and a plurality of messaging interfaces. Each messaging interface corresponds to one of a plurality of infrastructure controllers residing on an infrastructure under management by the processing platform. The master control plane is configured to communicate with each of the plurality of infrastructure controllers via the corresponding messaging interface. The plurality of infrastructure controllers are each configured to manage a corresponding one of a plurality of infrastructure components of the infrastructure under management. The master control plane is configured to communicate an instruction to a given infrastructure controller of the plurality of infrastructure controllers via the corresponding messaging interface and the given infrastructure controller is configured to modify the corresponding infrastructure component based at least in part on the communicated instruction.

These and other illustrative embodiments described herein include, without limitation, methods, apparatus, systems, and computer program products comprising processor-readable storage media.

BRIEF DESCRIPTION OF THE DRAWINGS

FIG. 5A illustrates an example of an assembled signed message generated according to the flow diagram of FIG. 4 in an illustrative embodiment.

FIG. 5B illustrates an example of an encoded message generated according to the flow diagram of FIG. 4 in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
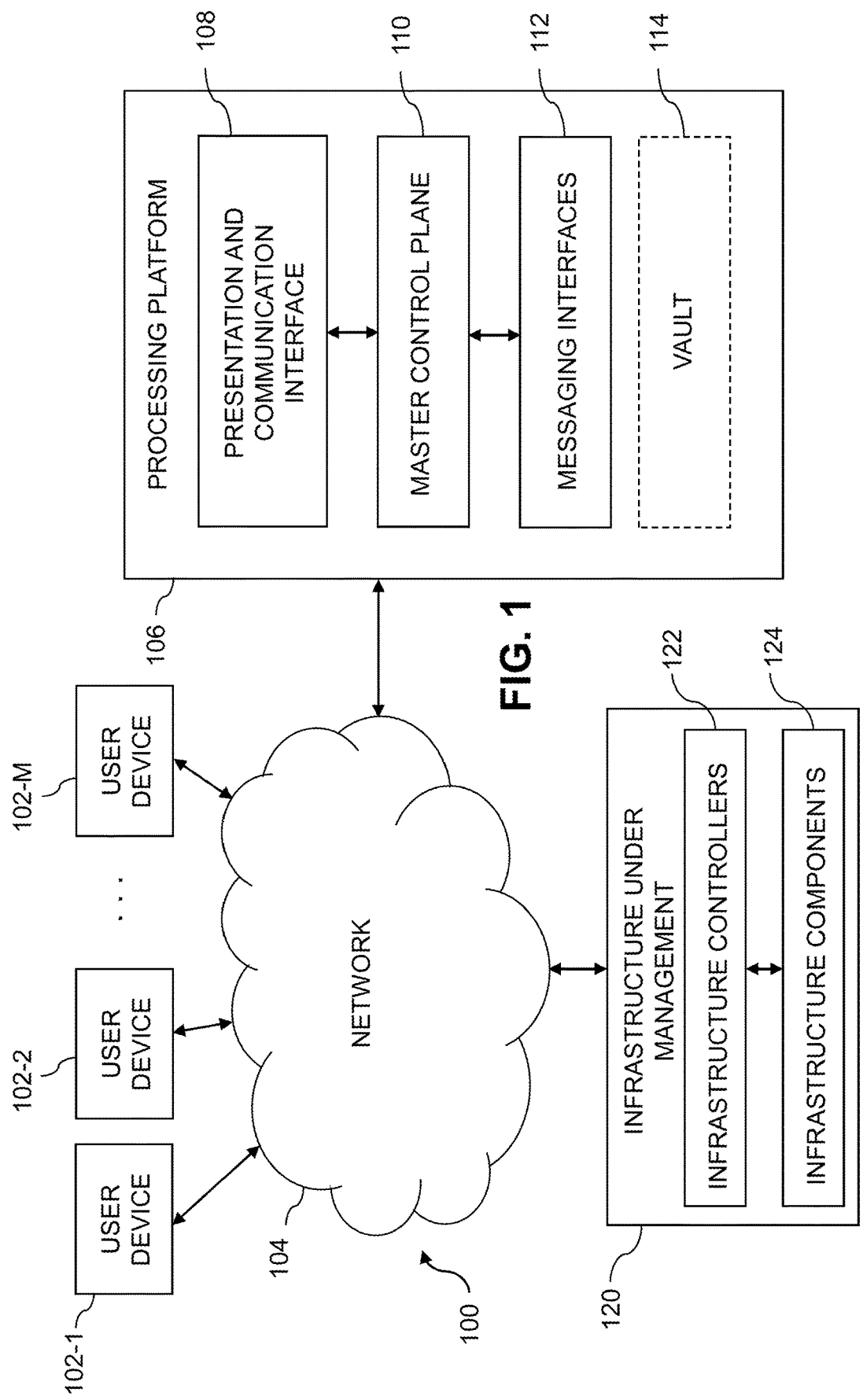
FIG. 1 is a block diagram of an information processing system configured in accordance with a centralized master control plane in an illustrative embodiment.

FIG. 1 shows an information processing system 100 configured in accordance with an illustrative embodiment. The information processing system 100 comprises a plurality of user devices 102-1, 102-2, ... 102-M, a network 104, a processing platform 106, and infrastructure under management 120.

The user devices 102 in this embodiment can comprise, for example, desktop, laptop or tablet computers, mobile telephones, or other types of processing devices capable of communicating with the processing platform 106 over the network 104. Users associated with the respective user devices 102 are assumed to run respective sets of applications utilizing corresponding sets of virtual resources of at least one cloud-based system provided by the processing platform 106. For example, such users may be respective tenants of a cloud data center or other type of multi-tenant environment provided by the processing platform 106, e.g., infrastructure under management 120. These tenants are examples of what are more generally referred to herein as respective "users" of the processing platform 106. Tenants or other users may also be referred to as "customers" of a cloud service provider.

In some embodiments, the virtual resources implemented by infrastructure under management 120 comprise a plurality of containers allocable to respective applications under the control of the cloud-based system. Additional or alternative virtual resources that may be used in a given embodiment include virtual machines. For example, the virtual resources may comprise a plurality of virtual machines allocable to the applications under the control of the cloud-based system. Various combinations of containers, virtual machines and other virtual resources may be used in other embodiments. For example, virtual resources may comprise containers running in virtual machines. In illustrative embodiments, the various combinations of containers, virtual machines, and other virtual resources may run or reside on infrastructure under management 120 and may be controlled by processing platform 106, e.g., via network 104.

The network 104 over which the user devices 102, the processing platform 106, and the infrastructure under management 120 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks. While illustrated as a network 104 over which communication between user devices 102, processing platform 106 and infrastructure 120 communicate, in some embodiments, user devices 102 and infrastructure under management 120 may each communicate with processing platform 106 over separate and distinct networks 104. While illustrated as a separate component of information processing system 100, in some embodiments, infrastructure under management 120 may be considered to be part of processing platform 106.

The processing platform 106 includes a plurality of processing devices each having a processor coupled to a memory, and is configured to implement a centralized command and control system for controlling the virtual resources of the cloud-based system provided by the infrastructure under management 120 for use by applications of the user devices 102.

By way of example, the processing platform 106 can be implemented at least in part utilizing converged infrastructure. Such converged infrastructure may comprise at least portions of VxRail™, VxRack™, VxRack™ FLEX, VxBlock™, or Vblock® converged infrastructure from VCE, the Virtual Computing Environment Company, now the Converged Platform and Solutions Division of Dell EMC.

As indicated above, the processing platform 106 in the present embodiment is assumed to implement at least one cloud-based system in conjunction with infrastructure under management 120. Such a cloud-based system is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The processing platform 106 and infrastructure under management 120 in the present embodiment are more particularly configured to implement virtual resources of one or more clouds for use by applications of tenants.

The processing platform 106 comprises a presentation and communication (PC) interface 108, a master control plane (MCP) 110, and a plurality of messaging interfaces 112. The infrastructure under management 120 comprises infrastructure controllers 122 and infrastructure components 124.

Processing platform 106 implements a PC interface 108 that illustratively provides one or more user interfaces or application program interfaces (APIs) that are accessible to one or more of the user devices 102 over the network 104 and are usable by the user devices 102 to communicate with the MCP 110. In illustrative embodiments, user devices 102 may communicate instructions or commands to the MCP 110 via network 104 using PC interface 108. In some embodiments, for example, the instructions or commands may comprise intent-based commands which cause the MCP 110 to command the infrastructure under management 120 to achieve a particular target state, e.g., add or remove a drive, power down, power up, etc. Intent-based commands are described in more detail below.

MCP 110 is configured to manage the infrastructure under management 120 via the messaging interfaces 112. The MCP 110 is a secure hybrid master control plane that leverages centralization and cryptographic techniques to reduce the footprint of automation adjacent to the managed infrastructure, to improve auditability and technical security, and to significantly improve scalability. With these advantages, infrastructure may be deployed with a minimal management footprint leading to reduced costs as well as a reduction in the scope and scale of the individual component products that are required to provide an infrastructure service.

In illustrative embodiments, MCP 110 centralizes the controller function, e.g., the fulfillment function, of the infrastructure under management 120 in a common logical location in the cloud while the infrastructure under management 120 may, for example, be located in many distinct physical sites or data centers. In some embodiments, MCP 110 may be located in a geographically distinct location from the physical sites or data centers of the infrastructure under management 120. In some embodiments, MCP 110 may be located in a logically distinct location from the infrastructure under management 120 while being located in the same geographic location (e.g., the same data center) as one or more pieces of infrastructure under management 120. In some embodiments, MCP 110 may be geographically co-located with some infrastructure under management 120 (e.g., in the same data center) and located in a geographically distinct location from other infrastructure under management 120.

In illustrative embodiments, the MCP 110 may receive an intent-based command from a user device 102, may determine a course of action required to fulfill the intent-based command, and may submit an instruction to execute the course of action to the infrastructure under management 120 via the messaging interfaces 112.

A dedicated messaging interface 112 is illustratively provided for each infrastructure controller 122 of the infrastructure under management 120, and presents a one-to-many control-to-target relationship between the MCP 110 and the infrastructure controllers 122. This relationship allows the information processing system 100 to scale up or down easily with minimum additional footprint at the infrastructure under management 120.

For example, in illustrative embodiments, processing platform 106 implements a plurality of messaging interfaces 112 that are configured to support communications between the MCP 110 and the infrastructure under management 120. In illustrative embodiments, messaging interfaces 112 provide communication pathways between the MCP 110 and infrastructure controllers 122 of the infrastructure under management 120. For example, in illustrative embodiments, a distinct messaging interface 112 may be provided on a one-to-one basis for each infrastructure controller 122 of the infrastructure under management 120 where the MCP 110 communicates with a given infrastructure controller 122 of the infrastructure under management 120 via the corresponding distinct messaging interface 112.

In an example embodiment, each messaging interface 112 comprises paired inbound and outbound queues for communicating with the corresponding infrastructure controller 122. For example, messages transmitted by the MCP 110 to a given infrastructure controller 122 are added to the outbound queue of the corresponding messaging interface 112. The given infrastructure controller 122 may then obtain these messages from the outbound queue and perform one or more actions based on their contents. As another example, messages transmitted by the given infrastructure controller 122 to the MCP 110 are added to the inbound queue of the corresponding messaging interface 112. The MCP 110 may then obtain these messages from the inbound queue and perform actions based on their contents. For example, the messages on the outbound queue may comprise commands or instructions to perform an action according to the intent received from the user device 102 and the messages on the inbound queue may comprise a response from the given infrastructure controller 122 to the commands or instructions that indicate that the actions taken by the infrastructure controller 122 based on the obtained commands or instructions have been successfully completed.

In illustrative embodiments, infrastructure controllers 122 are implemented by one or more processing devices of the infrastructure under management 120. As an example, a given infrastructure controller 122, as described herein, comprises one or more controller components of the infrastructure under management 120, and in some embodiments comprises a hierarchy of controller components, that are configured to control, modify, or change the infrastructure components 124 in the infrastructure under management 120. For example, in some embodiments, a given infrastructure controller 122 may comprise at least a first controller component that is configured to communicate with MCP 110 via messaging interfaces 112 and may comprise one or more other controller components that may be invoked by the first controller component to perform one or more actions on the infrastructure components 124, e.g., allocate or remove nodes, reconfigure switches, stand up virtual networking gear, etc. In some embodiments, a given infrastructure controller 122 may comprise a single controller component that both communicates with MCP 110 and performs the one or more actions on the infrastructure components 124.

The infrastructure components 124 illustratively comprise virtual resources of the infrastructure under management 120 including compute, storage and network resources associated with one or more host devices of the infrastructure under management 120. Such host devices are examples of what are more generally referred to herein as "processing devices." In some embodiments, infrastructure components 124 may be generally referred to as virtual resources or controlled components of the infrastructure under management 120. In illustrative embodiments, each infrastructure controller 122 may control one of the infrastructure components 124. In some embodiments, one or more of the infrastructure controllers 122 may control more than one of the infrastructure components 124.

In illustrative embodiments, security of the information processing system 100 is preserved through the use of a vault-based security protocol involving a rotating set of secrets stored in a centralized location such as, e.g., on or adjacent the MCP 110. Messages sent between the MCP 110 and the infrastructure controllers 122 are secured through the use of dating, targeting, signing, encryption, encoding, and secret rotation as will be described in more detail below.

It is to be appreciated that the particular processing platform configuration illustrated in the FIG. 1 embodiment is presented by way of example only, and other embodiments can utilize different arrangements of additional or alternative components. For example, the particular components 108-112 of the processing platform 106 can be varied in other embodiments. Accordingly, additional or alternative components can be used in other embodiments. Also, at least portions of the functionality of a particular one of the components 108-112 can be alternatively implemented in one or more other ones of the components 108-112. In additional embodiments, some or all of the functionality of the infrastructure under management 120 may be included as part of processing platform 106.

As mentioned previously, the virtual resources implemented by the infrastructure under management 120 illustratively comprise containers. Such containers are more particularly assumed to comprise respective Docker containers or other types of Linux containers (LXCs) implemented using operating system level virtualization based on kernel control groups. Containers may therefore comprise respective kernel control groups of a container host device operating system. In embodiments that utilize containers, the infrastructure under management 120 illustratively comprises a plurality of container host devices each implementing one or more of the containers. Each of the container host devices illustratively comprises at least one processor coupled to a memory. Such container host devices are also considered examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the infrastructure under management 120 using container cluster managers such as Docker Swarm or Kubernetes. Such cluster managers may be implemented within or in association with the cloud-based system.

The infrastructure under management 120 illustratively incorporates one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the infrastructure under management 120 in some embodiments is VMware® Photon OS™ which has a relatively small footprint and is designed to boot extremely quickly on VMware® platforms.

The infrastructure under management 120 in some embodiments incorporates components for providing certain types of management and orchestration functionality. Such components may include VCE Vision™ Intelligent Operations Software, or other types of management and orchestration components, including components from Pivotal Cloud Foundry, or various combinations of multiple ones of these or other components.

In some embodiments, certain functionality of the cloud-based system is made available to a user by a cloud service provider on a Software-as-a-Service (SaaS) basis. Such users may be associated with respective ones of the user devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 and infrastructure under management 120 of the FIG. 1 embodiment will be described in more detail below in conjunction with FIGS. 10 and 11. A given such processing platform and infrastructure under management comprises at least one processing device comprising a processor coupled to a memory, and the processing device may be implemented at least in part utilizing one or more virtual machines or other virtualization infrastructure.

Illustrative embodiments of the information processing system 100 will now be described in more detail.

Cloud infrastructure typically relies on extensive automation that is located close to the physical infrastructure under management. Often the automation supports HTTP-based APIs and command line interfaces, with internal mechanics that leverage queuing systems, message busses, logging systems, clustering technologies, service interfaces, and numerous inter-related technologies. However, such a system of automation typically depends on direct communication and proximity to the infrastructure under management for effectiveness and security framework compliance. The significant resources allocated to each portion of the infrastructure under management and the corresponding automation results in poor scalability in terms of deployment, operations and security as each addition to the infrastructure under management requires a substantial investment and allocation of resources.

In illustrative embodiments, the use of MCP 110 and messaging interfaces 112 reduces the required footprint of automation adjacent to the infrastructure under management while improving auditability and technical security, and significantly improves scalability. For example, by centralizing the control and fulfillment functions in the MCP 110, the security function may be centralized. In addition, one-to-many communications between the MCP 110 and each infrastructure controller 122 via corresponding dedicated messaging interfaces 112 improves scalability and security while reducing the footprint that is required at the infrastructure under management. With these advantages, additional infrastructure components 124 may be deployed with a minimal management footprint, in the form of infrastructure controllers 122, leading to reduced costs as well as a reduction in the scope and scale of the individual component products that are required to provide an infrastructure service.

As will be described in further detail below, illustrative embodiments provide an intent-based system that includes a centralized fulfillment engine and control center in the cloud for geographically remote operations, (e.g., in the form of the MCP 110), a minimal number of infrastructure controllers 122 or other footprint at the infrastructure under management 120, a technically secure communication system which provides a strong trail for auditing, (e.g., in the form of messaging interfaces 112), and support for policy-based controls. Each component will now be described in more detail below.

Intent-Based System with Fulfillment Engine

In an intent-based system, operators simply express a target state. The system then performs the necessary work to make the actual state match the target state. This technique is analogous to using a navigation system in a vehicle. For example, the driver of the vehicle may use the navigation system to specify a target state, e.g., moving the vehicle to a target location. The navigation system then determines the series of turns, maneuvers and other driver directions that are required to progress the vehicle toward the target location. As the vehicle progresses toward the target location, adjustments to the planned route may need to be made. For example, if the driver misses a turn, the navigation system automatically updates the series of turns, maneuvers, or other diver directions to continue progressing the vehicle toward the target location. The navigation system continually assesses the current state (position) against the target state (target location) and offers instructions/routing to inform the driver of the next required action. Similar concepts may be used in illustrative embodiments by implementing an intent-based storage system that utilizes MCP 110, as will be described in more detail below In illustrative embodiments, the MCP 110 functions to separate the intent of an operator, such as a user of a user device 102, from the fulfilment of that intent performed at the infrastructure under management 120. For example, a user may simply express an intent to achieve a target state, e.g., expand a cluster of nodes that is under management by MCP 110, and MCP 110 may determine the necessary actions to achieve such a target state, e.g., by identifying a target node to add to the cluster, issuing a command to the appropriate infrastructure controller 122, receiving a response from the appropriate infrastructure controller 122 that the node has been added, and reporting a successful expansion of the cluster to the user device 102.

As another example, MCP 110 may receive an intent-based message from a user device 102, e.g., via PC interface 108, comprising information indicating a desire of the user to achieve a target state, e.g., power-off of a particular server or other infrastructure component 124. The power-off may be performed logically through the use of an Integrated Lights Out Manager (ILOM), physically through smart-power distribution units (PDUs), or in another similar manner. To fulfill the received intent-based message and achieve the target state, the MCP 110 may perform a number of steps or actions.

For example, the MCP 110 may determine whether or not a current state of the infrastructure component 124 matches a target state and if so, may report a success to the user device 102 via PC interface 108, e.g., that the target state has been achieved.

As another example, the MCP 110 may determine whether or not a conflicting intent has been received, e.g., an intent-based message comprising information indicating a desire of the same or a different user to achieve a conflicting target state, a power-on state of the infrastructure component 124 in this example. If such a conflicting intent has been received, the MCP 110 may report an error to the user device 102 via PC interface 108, e.g., that conflicting intents have been received.

As another example, the MCP 110 may determine whether or not a duplicate intent has been received, e.g., another intent-based message comprising information indicating a desire of the same or a different user to achieve the target state, a power-off state of the infrastructure component 124 in this example. If such a duplicate intent has been received, the MCP 110 may join the new intent to the existing intent.

When an intent-based message is received that comprises information indicating a desired target state, the MCP 110 may, in some embodiments, store or otherwise save the target state. For example, with reference briefly to FIG. 2, MCP 110 may store the target state in one or more state tables 202 or other similar data structures associated with processing platform 106. In some embodiments, for example, processing platform 106 may comprise state tables 202, e.g., in a memory of processing platform 106. In some embodiments, state tables 202 may be located at a geographically remote location from processing platform 106 or a geographically remote location from MCP 110 where, for example, state tables 202 may be stored at another location on the cloud, and MCP 110 may access the information contained in the state tables 202 via network 104.

In illustrative embodiments, an entry in a given state table 202 may comprise, for example, a date and timestamp, a customer identifier, a user identifier, a target state, and a status. In some embodiments, an example entry may comprise: a date and timestamp of "1/2/19 8:45 am," a customer identifier of "987654," a user identifier of "CustomerAdmin1," a target state of "set cluster 123456 to eight nodes," and a status of "New".

Responsive to a received intent, MCP 110 identifies a gap between a target state and the current state and determines the necessary actions or routing that must occur to achieve the target state from the current state, e.g., which infrastructure controller 122 the MCP 110 should contact via message interfaces 112 to implement the intended target state. The MCP 110 may, for example, transmit a message or instruction to the appropriate infrastructure controller 122 to take one or more actions on the corresponding infrastructure component 124 to implement the intended target state.

In an embodiment, using the entry described above as an example, the MCP 110 may validate whether or not there are any conflicting or duplicate entries in the state tables 202 that correspond to the target state, e.g., an entry comprising a duplicate target state of setting the cluster 123456 to eight nodes or an entry comprising a conflicting target state of setting the cluster 123456 to another number of nodes such as, e.g., four nodes. If there is a duplicate entry, MCP 110 may respond to the user with the status of the existing intent, such as, e.g., accept, not completed, successfully completed, or another status. If there is a conflicting entry, MCP 110 may respond to the user with an indication of an error, conflict, or other similar indication.

If there are no conflicting or duplicate entries, in the example embodiment, the MCP 110 queries the corresponding infrastructure controller 122 to determine how many nodes currently exist in cluster 123456. MCP 110 compares the intended size of eight nodes to the existing size, and decides what actions are required to achieve the target state, e.g., whether to add nodes, remove nodes, or maintain the same number of nodes. The MCP 110 changes the status of the entry in the state tables 202 to indicate in-progress/pending, and issues operations to the corresponding infrastructure controller 122 to perform the required actions to achieve the target state.

While the infrastructure controller 122 takes the required actions to implement the intended target state, the MCP 110 may re-assess the current state to determine whether the current state matches the target state. For example, MCP 110 may obtain a current state of the infrastructure component 124 from the infrastructure controller 122, e.g., via the corresponding messaging interface 112. In some embodiments, if the current state does not match the intended state, the MCP 110 may issue further messages or instructions to the infrastructure controller 122 via messaging interfaces 112 to close the gap between the current state and the target state. MCP 110 continues re-assessing the current state until an indication of completion is received from the infrastructure controller 122 indicating that the infrastructure component 124 has been modified to achieve the target state. Upon completion of any actions being taken, the MCP 110 may set the status of the entry in the state table 202 to indicate a success or failure of achieving the intended target state.

Once the MCP 110 determines that the current state matches the target state, e.g., one or more infrastructure components have been modified to achieve the target state, the MCP 110 may report success back to user device 102 via PC interface 108 and update the status of the entry in the state table 202 accordingly.

The above examples illustrate two threads of action. One thread (e.g., the user interface or user interaction) involves the intent-based interaction between the user device 102 and the MCP 110 where, for example, a user of the user device 102 expresses an intent or desire to achieve a target state, the MCP 110 saves and tracks the progress of the system to achieve the target state, and when the target state has been achieved, the MCP 110 responds with an indication of success.

The other thread (e.g., the fulfillment function) involves the fulfillment of the expressed intent by the MCP 110 by issuing one or more commands or instructions to the infrastructure under management 120 to achieve the target state. For example, the MCP 110 identifies any gaps between a target state and the current state of the infrastructure under management 120, determines actions to be taken to close the gap between the target state and the current state, communicates commands or other instructions based on the determined actions to the infrastructure under management 120, e.g., to infrastructures controllers 122 via the corresponding messaging interfaces 112, and reassesses the current state to determine whether or not further actions are necessary to close the gap between the current state and the target state.

In this manner, an intent to achieve a target state is expressed, recorded and checked for achievement, and the fulfillment function is executed to drive convergence between current and target states.

In illustrative embodiments, the MCP 110 functions to separate the expression of intent to achieve a target state, as received from a user device 102 via PC interface 108, from the fulfillment actions performed by the infrastructure under management 120 in order to reconcile the current state to match the expressed intent to achieve the target state. In illustrative embodiments, these separate threads may be described as the user interface and the fulfillment function, respectively.

Centralized Control Center in the Cloud for Remote Operations

Figure 2:
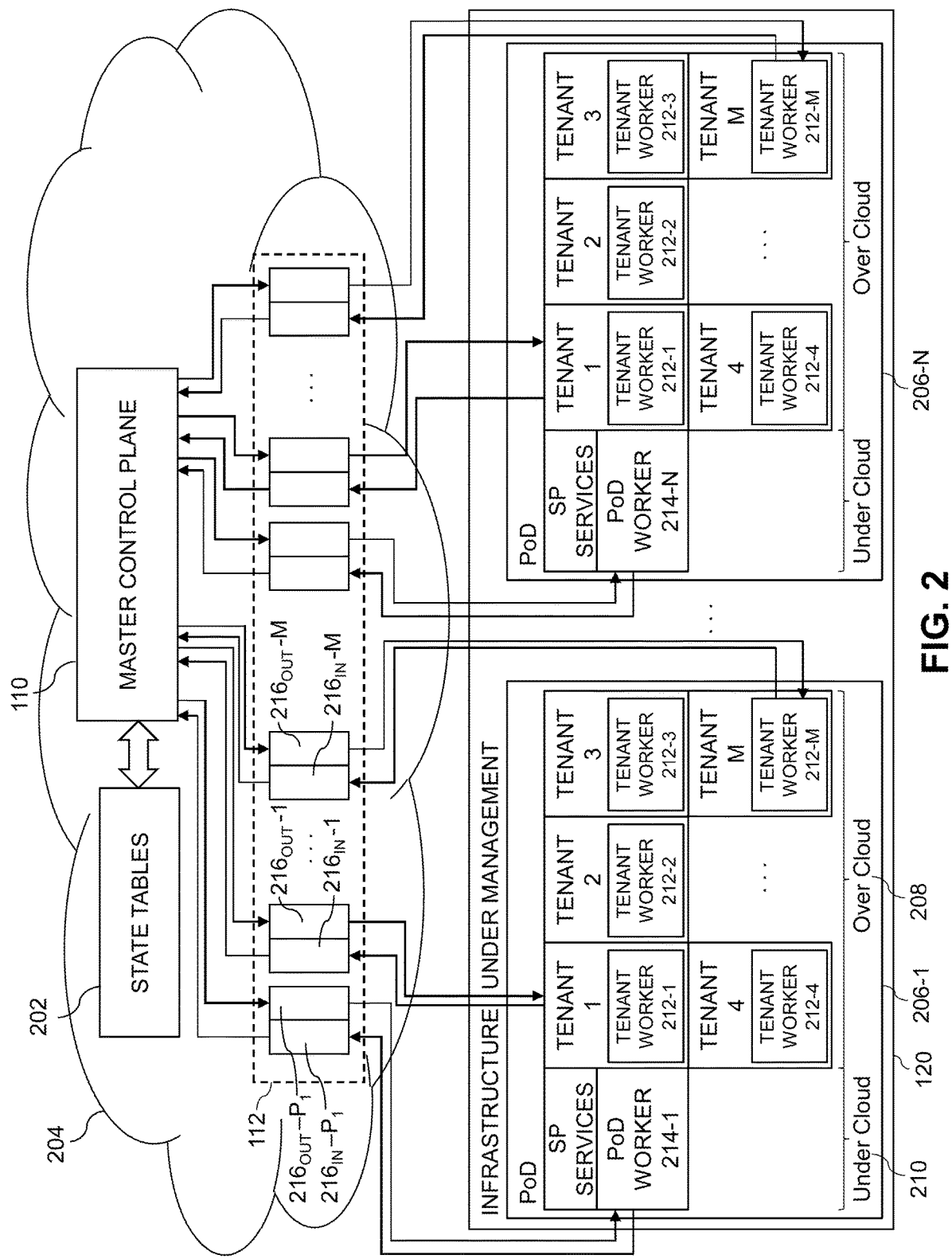
FIG. 2 is a block diagram illustrating an example architecture of a portion of the information processing system of FIG. 1 in accordance with an illustrative embodiment.
Figure 3:
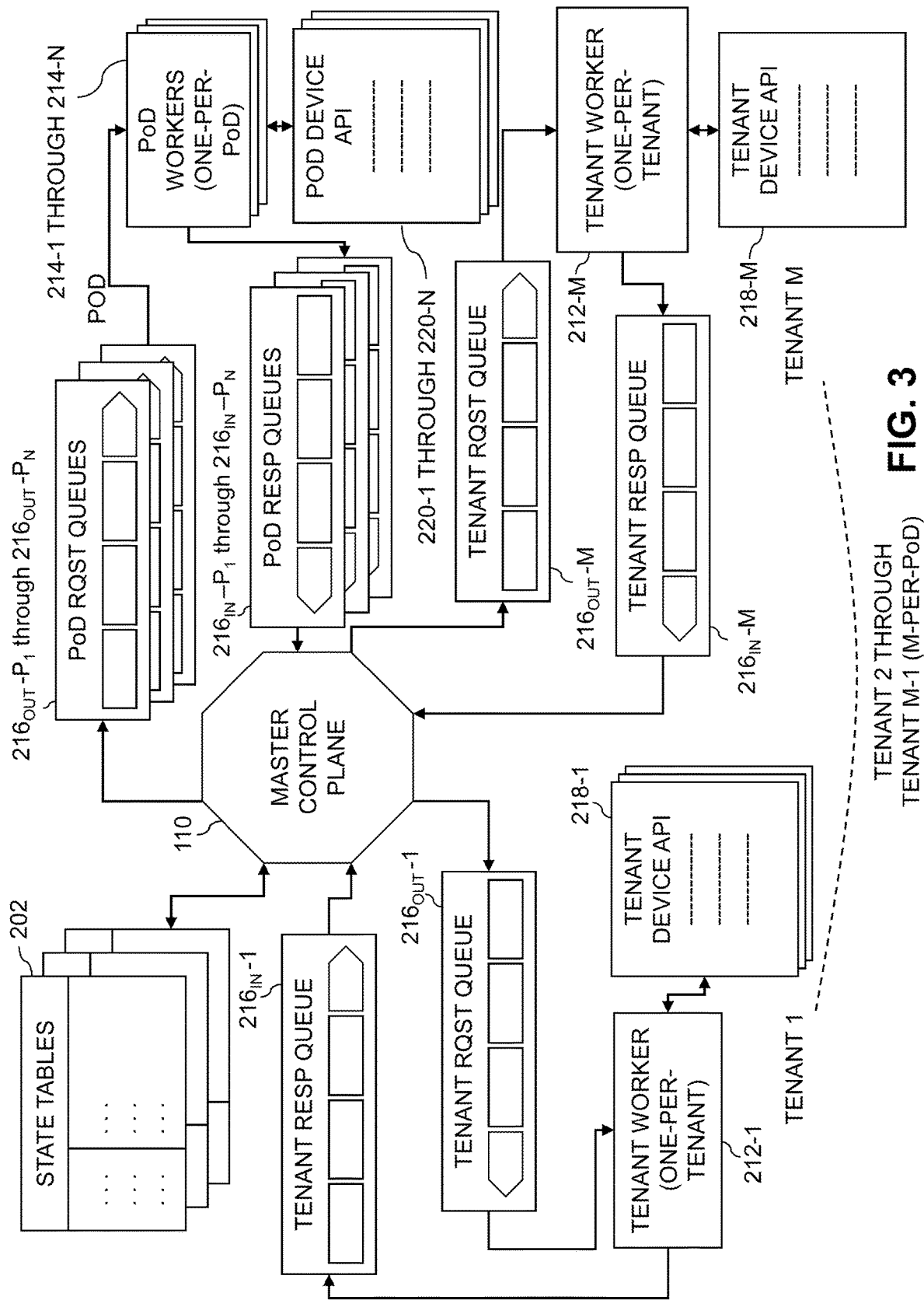
FIG. 3 is a block diagram illustrating an example of flow paths between the master control plane and infrastructure controllers of the information processing system of FIG. 1 in accordance with an illustrative embodiment.

With reference now to FIGS. 2 and 3, in an illustrative embodiment, the centralization of the controller function, e.g., the fulfillment function, in a common logical location in the cloud provides substantial benefits over a fulfillment function located in close proximity to infrastructure under management 120. For example, in illustrative embodiments, the fulfillment functions are located together at the MCP 110 while the infrastructure under management 120 is located in, possibly, many distinct physical sites or data centers.

In an example embodiment, as seen, for example, in FIGS. 2 and 3, the MCP 110 is located in a cloud 204, e.g., network 104, and communicates with the infrastructure under management 120 via messaging interfaces 112, as described above.

In some embodiments, infrastructure under management 120 comprises a plurality of Point-of-Delivery components (PoDs) 206-1 . . . 206-N, referred to herein generically as PoDs 206, each of which comprises a plurality of infrastructure components 124 in an over cloud 208 and an under cloud 210. For example, the over cloud 208 of each PoD 206 comprises infrastructure components 124 such as, e.g., tenants 1 through M, where, for example, each PoD 206 may comprise any number of tenants. As another example, the under cloud 210 of each PoD 206 comprises infrastructure components 124 such as, e.g., the functionality, nodes, network resources, disk arrays, etc., on which the tenants 1 through M reside in the PoD 206.

In illustrative embodiments, each tenant 1 through M of each PoD 206 is managed by a corresponding infrastructure controller 122 (FIG. 1) which comprises a respective tenant worker, e.g., tenant workers 212-1 through 212-M, respectively, more generically referred to as tenant workers 212. The corresponding infrastructure controller 122 may also comprise one or more other component controllers associated with the respective tenant that are configured to manage at least a portion of the respective tenant. In some embodiments, for example, the tenant workers 212-1 through 212-M manage the corresponding tenants 1 through M via corresponding tenant device APIs 218-1 through 218-M, respectively. In some embodiments, the tenant device APIs 218 may be APIs that are associated with and are specific to the corresponding infrastructure component 124. For example, the tenant device APIs 218 may be device APIs that are native to the particular infrastructure component 124 under management by the infrastructure controller 122.

In illustrative embodiments, the underlying functionality, network resources, etc. of each PoD 206 is managed by a corresponding infrastructure controller 122 which comprises a respective PoD worker, e.g., PoD workers 214-1 through 214-N, respectively, more generically referred to as PoD workers 214. The corresponding infrastructure controller 122 may also comprise one or more other component controllers associated with the respective PoD 206 that are configured to manage at least a portion of the respective PoD 206. In some embodiments, for example, the pod workers 214-1 through 214-N manage the underlying functionality, network resources, etc. of each PoD 206 via corresponding PoD device APIs 220-1 through 220-N, respectively. In some embodiments, the PoD device APIs 220 may be APIs that are associated with and are specific to the corresponding infrastructure component 124. For example, the PoD device APIs 220 may be device APIs that are native to the particular infrastructure component 124 under management by the infrastructure controller 122.

In some embodiments, each PoD 206 may comprise a single corresponding PoD worker 214 and a plurality of tenant workers 212 each corresponding to a particular tenant residing on that PoD 206. In some embodiments, a PoD 206 may comprise more than one PoD worker 214.

As further shown in FIGS. 2 and 3, the MCP 110 communicates with each of the pod workers 214 and tenant workers 212 via a corresponding messaging interface 112, referred to generically in FIGS. 2 and 3 as a paired inbound queue $216_{IN}$ and outbound queue $216_{OUT}$. For example, MCP 110 communicates with the particular PoD worker 214-1 of PoD 206-1 via a corresponding messaging interface 112 in the form of a paired inbound queue $216_{IN}$-P$_1$ and outbound queue $216_{OUT}$-P$_1$ and communicates with each tenant worker 212-1 through 212-M of PoD 206-1 via corresponding messaging interfaces 112 in the form of corresponding paired inbound queues $216_{IN}$-1 through $216_{IN}$-M and outbound queues $216_{OUT}$-1 through $216_{OUT}$-M, respectively. Similar messaging interfaces may be used for the other PoDs 206.

While the messaging interfaces 112 used by MCP 110 for communicating with the infrastructure controllers 122 are described above as paired inbound queues $216_{IN}$ and outbound queues $216_{OUT}$ in illustrative embodiments, other types of corresponding messaging interfaces 112 aside from queues may alternatively be utilized.

As described above with continued reference to FIGS. 2 and 3, processing platform 106 comprises a separate messaging interface 112, e.g., a paired outbound queue $216_{OUT}$ and inbound queue $216_{IN}$, for communicating with each infrastructure controller 122 of the infrastructure under management 120. This one-to-many control-to-target relationship with individual communication interfaces 112 for each infrastructure controller 122 of the infrastructure under management 120 represents significant benefit by allowing one control system to scale to large numbers of target infrastructure controllers 122.

The MCP 110 is configured to distribute commands on the outbound queues $216_{OUT}$ to the corresponding infrastructure controllers 122 e.g., PoD workers 214 or tenant workers 212 of the infrastructure under management 120, and to receive responses on the corresponding paired inbound queues $216_{IN}$ from the corresponding infrastructure controllers 122.

In some embodiments, an example message that may be sent by MCP 110 to an infrastructure controller 122 via the corresponding outbound queue $216_{OUT}$ may comprise a command to move ports on top-of-rack switches to a virtual local area network (VLAN). Likewise, an example message that may be sent by the infrastructure controller 122 to the MCP 110 via the corresponding inbound queue $216_{IN}$ may comprise a response from the infrastructure controller 122 comprising information or other indication of a successful execution or implementation of the command received from the outbound queue $216_{OUT}$, e.g., that the ports have been moved to the VLAN.

Minimal Workers at the Edge

Where the MCP 110 represents a first half of the control structure, the infrastructure controllers 122, e.g., the PoD workers 212 and tenant workers 214, represent the other half of the control structure. While in some embodiments, the MCP 110 is geographically remote from the infrastructure under management 120, the infrastructure controllers 122 are located adjacent to or in close proximity to the infrastructure under management 120. For example, the infrastructure controllers 122 may be located within a data center or other similar location where the physical devices comprising the infrastructure under management 120 are present.

In illustrative embodiments, the infrastructure controllers 122 obtain information, e.g., instructions, commands, or other similar information, from the MCP 110 via the corresponding outbound queues $216_{OUT}$ and interacts with "local" infrastructure devices of the infrastructure under management 120, e.g., switches, servers, storage arrays, disks, etc., according to the obtained information. In some embodiments, the outbound queues $216_{OUT}$ may comprise a uniform resource identifier (URI) associated with the corresponding infrastructure controller 122.

For example, in some embodiments, a message inside the outbound queue $216_{OUT}$ from the MCP 110 to the infrastructure controller 122 contains a URI and associated data needed to invoke the local infrastructure devices. The infrastructure controller 122 reads the message off the outbound queue $216_{OUT}$ and extracts the message. The infrastructure controller 122 then accesses the specified URI, which invokes the local infrastructure devices to make the target changes.

As part of obtaining and acting on the obtained information, the infrastructure controllers 122 may validate the obtained information as authentic, unmodified and signed by the MCP 110. Any information that has been validated is used by the infrastructure controller 122 to interact with the corresponding infrastructure component 124 by, for example, calling the corresponding device API function, e.g., tenant device APIs 218 or PoD device APIs 220, which is an API that is native to target infrastructure component 124. In accordance with the obtained information, the infrastructure controller 122 may, for example, employ routing tables to process and then send commands and data arguments to downstream API functions on target infrastructure component 124. In this manner, infrastructure controllers 122 receive information such as instructions or commands from the MCP 110 and then make the direct requests to the underlying infrastructure components 124 in the infrastructure under management 120.

In some embodiments, the infrastructure under management 120 such as, e.g., infrastructure controllers 122 and infrastructure components 124 support representational state transfer (REST) structures and employ RESTful functionality. In some embodiments, command-line type interfaces may also or alternatively be used.

After a direct request is sent to an underlying infrastructure component 124, the infrastructure controller 122 obtains an indication from the infrastructure component 124 of the status of the direct request and evaluates the indication for validity. For example, the infrastructure component 124 may indicate that the direct request has been successfully implemented or that there was an error in implementing the direct request. The infrastructure controller 122 generates a response to the MCP 110, e.g., a message or other information, based on the indication obtained from the infrastructure component 124. The response is placed onto the corresponding inbound queue $216_{IN}$ by the infrastructure controller 122 and the MCP 110 obtains the response from the corresponding inbound queue $216_{IN}$. The MCP 110 processes the obtained response and determines a current state of the infrastructure component 124 based on the obtained response. In some embodiments, the determined current state of the infrastructure component 124 may be stored or otherwise saved by MCP 110, e.g., in state tables 202. The MCP 110 may compare the current state to the intended target state stored in the state tables 202 to determine whether or not the target state has been achieved. If the target state has not been achieved, e.g., the current state does not match the target state, the MCP 110 may place further direct requests on the outbound queue $216_{OUT}$ for the infrastructure controller 122 to act on. The MCP 110 may also provide an indication to the user or operator of the user device 102 about whether or not the intended target state has been achieved, e.g., via PC interface 108.

The above described control loop, i.e., MCP 110 to infrastructure controller 122/infrastructure controller 122 to MCP 110 over the messaging interfaces 112, provides an efficient and scalable mechanism that allows the MCP 110 to direct the infrastructure controllers 122 to achieve a target state of the corresponding infrastructure components 124 while separating the MCP 110 from the actual implementation details necessary to achieve that target state. For example, it is not necessary that the MCP 110 is aware of the particular extensible layering component between the infrastructure controllers 122 and the infrastructure components 124, e.g., the RESTful interfaces. Instead, the infrastructure controllers-to-infrastructure components layer maps infrastructure component-specific functionality to the infrastructure controller 122 functions and thus, ultimately, to the MCP 110. For example, the infrastructure controller 122 communication interfaces (e.g., upstream to the MCP 110 via messaging interfaces 112 and downstream to the infrastructure components 124 using RESTful APIs) enables a general control loop approach at the MCP 110 to infrastructure controller 122 interface while still accounting for the specific, mutable infrastructure component-specific instruction sets that the infrastructure controllers 122 use to actually obtain and set the state on the infrastructure components 124.

As an example, the MCP 110 can simply know that there are mechanisms to move switch ports to VLANs or upgrade firmware on a server, but it does not need to understand the mechanism of how that action is performed by the corresponding infrastructure controller 122. Instead, the MCP 110 may simply express an intent to achieve a target state to an appropriate infrastructure controller 122 via the corresponding messaging interface 112, e.g., the corresponding outbound queue $216_{OUT}$, and receives a response from the appropriate infrastructure controller 122 of a success or failure to achieve the target state. The MCP 110 may then initiate additional control loop actions as necessary based on whether the response is a success or failure.

By centralizing the MCP 110 and separating the MCP 110-to-infrastructure controller 122 functionality from the infrastructure controller 122-to-infrastructure component 124 functionality, the typical sprawl of supporting technology required at the infrastructure under management 120 is mitigated by only deploying infrastructure controllers 122 that are necessary to deliver the required services.

For example, the infrastructure controllers 122 and supporting control and communication logic that are typically deployed to the infrastructure under management 120 are often configured for use with infrastructure components 124 that are not currently included as part of the infrastructure under management 120 since such components may be added in the future. By separating the control and communication logic from the infrastructure controllers 122, e.g., using MCP 110 and messaging interfaces 112, such redundancy may be reduced since only those infrastructure controllers 122 that are required to interface with the infrastructure components 124 that are currently included in the infrastructure under management 120 are required to be deployed.

In addition, as new infrastructure components 124 are added to the infrastructure under management 120, the typical supporting control and communication logic does not also need to be added, as this functionality has already been centralized in the MCP 110 and messaging interfaces 112. The addition of a new infrastructure component 124 to the infrastructure under management 120 simply requires deployment of a corresponding infrastructure controller 122 that may then communicate with the centralized MCP 110 via a corresponding messaging interface 122. Thus, the inventory of the infrastructure under management 120 including infrastructure components 124 and infrastructure controllers 122 is based on the actual inventory of infrastructure under management 120, and not on the universe of devices that might potentially be included in the inventory.

Technically Secure—Strong Cryptographic and Audit Disciplines

The architecture of the system can be described as actors and their communications channels. The actors are the MCP 110 and infrastructure controllers 122, e.g., PoD workers 214 and tenant workers 212, and they implement logic and perform work that is initiated and fulfilled using the messaging interfaces 112, e.g., paired outbound queues $216_{OUT}$ and inbound queues $216_{IN}$, as communication channels.

The security model is notionally built on distinct, targeted MCP-to-infrastructure controller trust relationships that are aligned with time-stamped, symmetric-key encrypted messages. The security design stipulates that 1) the actors (e.g., MCP and infrastructure controllers) require identity management and 2) the messages on queues require authenticity and encryption. Stated more directly, the two foundational security design perspectives on the MCP 110 are identity management and message security.

Identity Management

Strong identity management (IdM) ensures that all actors on the MCP 110 system are who they say they are. The IdM design of the system provides mechanisms to establish trust between MCP 110 and infrastructure controllers 122, to establish trust between MCP 110 and the messaging interfaces 112, to establish trust between infrastructure controllers 122 and messaging interfaces 110, perform audits, and to take policy-based actions if required.

At its core, the IdM design can be described as a storage of rotatable shared secrets, e.g., keys for encryption and decryption, in a vault 114 (FIG. 1) with access granted only to token-bearing clients. In illustrative embodiments, the vault 114 may be located on the cloud, for example, as part of processing platform 106. In some embodiments, vault 114 may be located separate from processing platform 106, either physically or logically, and may be accessible by processing platform 106, MCP 110, and infrastructure controllers 122 via network 104. In some embodiments, the vault 114 may be referred to as a cloud vault.

Additional security in the design is achieved through vault policies that restrict client access to just the specific secrets that enable a client to perform its work. This segmentation enables highly granular restrictions for access to secrets, delivering a means of compartmentalizing access to functions, infrastructure controllers 122 and messaging interfaces 112. In illustrative embodiments, such a segmentation results in a large number of secrets being used in the design, for example, potentially two secrets per paired inbound queue $216_{IN}$ and outbound queue $216_{OUT}$ of the messaging interface 112, rotated at a given frequency.

The vault 114 addresses the challenge of a large and changing numbers of required secrets by providing a centralized and secure method for distribution and management of the secrets. For example, vault 114 acts as a proxy for secret storage, distribution, and management, and provides a mechanism for any infrastructure controller 122 or other entity in the system to use a token or certificate to access specific segmented secrets stored in the vault 114. The secrets a token-bearing client such as, e.g., an infrastructure controller 122, retrieves from the vault 114 are then used as authentication to read from, and write to, the corresponding messaging interfaces 112. For example, the secrets may be used for encrypting and decrypting communications placed on and obtained from the messaging interfaces 112, and may be required to access the messaging interfaces 112, or may be used in other ways to protect the integrity of communications between the MCP 110 and infrastructure controllers 122 via messaging interfaces 112.

In illustrative embodiments, the vault 114 comprises a centralized entity that provides highly controlled means for generating, inserting, and managing secrets for use in association with master control plane 110, messaging interfaces 112, and infrastructure controllers 122. Since all security efforts are focused on ensuring that this vault 114 and its secrets under management are rigorously maintained, logged, and audited, a higher level of assurance of secret security and quality can be maintained. Vault 114 also scales well as additional infrastructure under management 120, e.g., additional PoDs or components thereof, are provisioned. For example, the vault 114 may ensure that the secret policy and the comprehensive application of it, for example, secret rotation, is achieved authoritatively in the centralized location of all secrets, and is performed as quickly and efficiently as possible.

The vault 114 also provides a critical audit point for all actions on the vault 114 (e.g., tracing client access requests). The audit capabilities are integral to the vault design and enable critical risk mitigation and compliance assurance efforts. In some embodiments, machine learning may be implemented to detect anomalies and other patterns in correlation with vault access, for example, using application logs.

Message Security

Figure 4:
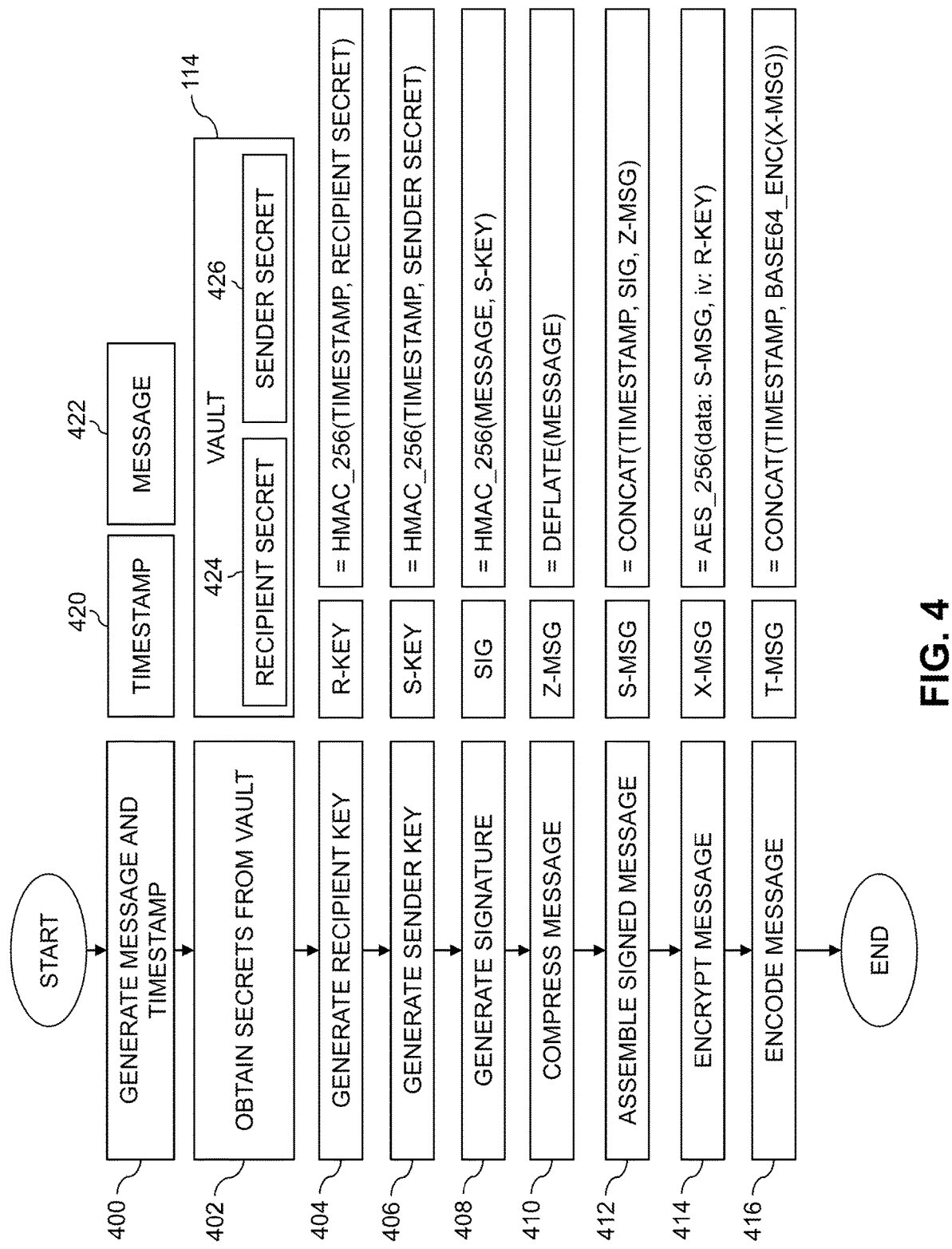
FIG. 4 illustrates an example flow diagram illustrating the dating, targeting, signing, encrypting, and encoding of a message in an illustrative embodiment.

Message security, as disclosed herein, extends accepted security measures to eliminate vulnerabilities that would otherwise pose a risk to the system. Message security comprises techniques including dating, targeting, signing, encryption, and secret rotation as will be described below with reference to FIGS. 1 and 4 through 6. The process as shown in FIG. 4 includes steps 400 through 416, and is suitable for use in the system 100. It is to be understood that this particular process is only an example, and that additional or alternative processes can be carried out in other embodiments.

Dating is performed by placing a timestamp on messages as a practical security measure. The timestamp can be used in several ways. For example, a timestamp may be used to reject old messages as a means of preventing an intruder from re-playing old messages during an attack.

In illustrative embodiments, a timestamp 420 may comprise a year-month-day-hour-minute-second (YYYYMMD-Dhhmmss) format. Any other format or timescale may be used for the timestamp 420.

At 400, in illustrative embodiments, timestamp 420 may be generated by an entity such as, e.g., MCP 110 or an infrastructure controller 122, in conjunction with the generation of a corresponding message 422 that will be submitted via a particular messaging interface 112.

The dedicated MCP-to-infrastructure controller messaging interfaces 112 also provide targeted communications between the MCP 110 and each of the infrastructure controllers 122. For example, a message 422 submitted on a particular messaging interface 112, or a particular inbound or outbound queue 216, is authentic from the perspective of the actors on either end of the messaging interface 112 with regard to identification of the source and destination, i.e., the MCP 110 and the corresponding infrastructure controller 122. However, the message 422 is only valid on that particular messaging interface 112, or that particular inbound or outbound queue 216. To avoid messages from one messaging interface 112 being valid on another messaging interface 112, distinct source (e.g., sender) and target (e.g., recipient) keys are generated based on the secrets in vault 114 and used cryptographically in the signing and encryption of the message 422. In illustrative embodiments, the recipient and sender keys are hash-based keys. This simple but powerful technique prevents injection of confusion into the system by ensuring per messaging interface 112 or per queue 216 validity.

At 402, for example, a recipient secret 424 and a sender secret 426 corresponding to the particular messaging interface 112, or particular inbound or outbound queue 116, are obtained from vault 114. In some embodiments the obtained recipient and sender secrets may also or alternatively correspond to an infrastructure controller 122 that is either the source or destination of the message 422. These secrets are used to generate respective recipient and sender keys. In illustrative embodiments, the recipient secret 424 and sender secret 426 are obtained from vault 114 by the entity that generates the message 422, e.g., the MCP 110 or the particular infrastructure controller 122.

In illustrative embodiments, for example, the dating and targeting are combined together during the generation of sender and recipient keys for use in the encryption and signing of the message 422. For example, timestamp 400 may be used in conjunction with the recipient secret 424, sender secret 426, or both, in the encryption and signing of the message 422 that is being submitted on the particular messaging interface 112.

In some embodiments, for example, where each inbound and outbound queue 216 is assigned its own corresponding recipient secret 424 and sender secret 426 by vault 114, the entity that generated the message 422, e.g., host device 110 or the particular infrastructure controller 122, may obtain the appropriate recipient secret 424 and sender secret 426 for the particular queue to be used, e.g., the inbound or outbound queue 216, from vault 114.

At 404, the timestamp 420 and obtained recipient secret 424 are used to generate a recipient key (R-KEY) that may be used during encryption of the message 422. For example, the R-KEY may be generated using a 256-bit hash-based message authentication code (HMAC_256) algorithm with the timestamp 420 and recipient secret 422 as inputs.

At 406, the timestamp 420 and obtained sender secret 426 are used to generate a sender key (S-KEY) may be used during signing of the message 422 as described below. For example, the S-KEY may also be generated using the HMAC_256 algorithm with the timestamp 420 and sender secret 426 as inputs. While step 404 is described above as being performed before step 406, step 404 may alternatively be performed after step 406 or in conjunction with step 406.

With standard cryptographic protocols, digital signatures are included with messages to provide recipients confidence that a message is authentic. This standard approach is extended in illustrative embodiments to include timestamp 420 in the signature. This supports and enables the time-based features of the disclosed system including the prevention of replay attacks, rotation and invalidation of keys for any time period, and also serves as an additional factor that places another significant burden on malefactors attempting to attack the system. Little to no additional risk is introduced by the inclusion of the timestamp 420 in the signature in exchange for a minimal cost of effort and complexity while the inclusion delivers significant additional benefits to the overall security of the system.

For example, when a new secret is generated, it comprises a "start time" from which it is valid. A prior secret will have a "start time" that is earlier, and therefore is no longer valid as of the "start time" of the new secret.

The combination of a secret and time stamp is used to generate an encryption key (sender and receiver), which is then used in the encryption and decryption of the message. This mechanism allows for in-flight messages that were already created to remain valid, as their encryption key and timestamp are tied to the prior secret during its valid period. However, any new messages from time of the generation of the new secret will generate and use a new set of encryption keys, and any messages encrypted or decrypted using the old secret or keys after the new secret has been generated will not be valid and will not decrypt properly. Improper decryption is easily detected, for example, due to the internal time stamp at the beginning of each message, i.e., if the decrypted message does not include a time stamp at its head, then the decryption failed. If a time stamp is present at the head of the decrypted message but does not match the outer time stamp, this is an indication that the message has been forged or tampered with.

At 408, for example, the message 422 and the S-KEY are used to generate a message signature (SIG) for use in signing the message 422. In some embodiments, for example, the SIG may be generated using the HMAC_256 algorithm with the message 422 and S-KEY as inputs.

At 410, the message 422 may be compressed prior to encryption to generate a compressed message (Z-MSG). For example, in illustrative embodiments, the message 422 may initially be in a clear text format such as, e.g., JavaScript Object Notation (JSON) format or a simple American Standard Code for Information Interchange (ASCII) text format using 7 bits of an 8-bit byte. Following the compression, in illustrative embodiments, the Z-MSG is now binary data that utilizes all 8-bits of the byte. For example, a deflate algorithm may be used to compress the message 422 into Z-MSG. Any other compression algorithm may be used to generate Z-MSG.

In some embodiments, for example, an off-the-shelf compression library and algorithm to compress or decompress a message may be utilized. For example, data may be passed into the algorithm, and compressed data may be obtained as an output or vice versa. The Deflate compression algorithm is an example of a generally known, accepted, and used compression algorithm that may be utilized in illustrative embodiments.

While compressing each message is not strictly necessary for the system to function, the use of compression provides numerous benefits to the system including improved network performance and strengthened encryption. For example, when a message is compressed, less data is sent on the queues and therefore faster response times may be achieved.

In addition, regardless of the strength of modern cryptosystems, less ciphertext and more entropic plaintext results in improved encryption, as it gives an attacker less to work with and makes their job much harder. For example, where a message contains a JSON format, there is a repetitive syntax which generally includes a lot of white space for readability purposes. Compression generally reduces the size of such objects, e.g., by removing or condensing the white space, where the more complex the object, the greater the return on compression.

In illustrative embodiments, since the design of the system allows for delays, having all of the messages use compression simplifies the logic in decoding since no sentinel is required to indicate or determine whether or not the payload is compressed.

In addition, the use of a compression algorithm adds an additional check on message content validity. For example, if the corresponding decompression were to fail, a forgery or alternation of the message may be suspected. For example, while it is known to be difficult to alter or forge a message where plain text can be manipulated, it is the even more difficult to accomplish that feat where the message itself is also compressed.

At 412, a signed message (S-MSG) is assembled based at least in part on the timestamp 420, SIG, and Z-MSG. For example, a concatenation of the timestamp 420, SIG, and Z-MSG may be performed resulting in an S-MSG as illustrated in FIG. 5A. In some embodiments, for example, the timestamp 420 may comprise the first 14 bytes of S-MSG, the SIG may comprise the next 32 bytes of S-MSG, and the Z-MSG may comprise the remaining portion of the S-MSG. For example, Z-MSG may have a variable length depending on the contents of the message 422 and the compression algorithm that is used to generate the Z-MSG.

In illustrative embodiments, all messages 422 are encrypted, even if there is nothing "sensitive" in the message 422. Encryption provides a technical shield against unintended or unexpected consequences. For example, by encrypting all messages 422, the system may be protected from accidental or intentional data corruption.

At 414, for example, the S-MSG is encrypted, e.g., using a 256-bit advanced encryption standard (AES_256) algorithm, to generate an encrypted message (X-MSG). For example, in illustrative embodiments the S-MSG may be used as the data field of the AES_256 algorithm while the R-KEY may be used as the iv field. Any other encryption algorithm may alternatively be used. In alternative embodiments, some or none of the messages 422 may be encrypted.

In some illustrative embodiments, messaging interfaces 112 may implement eXtensible Markup Language (XML) functionality where, for example, payloads may be submitted to the messaging interfaces 112 in an XML format or as part of an XML document. In some embodiments, messaging interfaces 112 may also or alternatively implement other payload formats and functionality.

The encrypted message X-MSG in illustrative embodiments is in a binary format, for example, due to the compression at 410. In order to make the binary data in the X-MSG safe to include in XML and persist in the messaging interface 112, the X-MSG may be encoded in base64 at 416 to generate an encoded message (T-MSG). For example, a base64 encoding algorithm may be used to encode X-MSG into a base64 format.

By encoding the encrypted X-MSG into a base64 format, it may be stored inside of an XML document in a safe manner without inadvertently triggering any special syntax-based XML commands. For example, XML has many special characters that cause it to act in special ways including, e.g., <, >, ", and &. Since base64 includes only A-Z, a-z, 0-9, +, and /, none of which are a special character in XML, a base64 encoded message such as, e.g., T-MSG, may be used inside of an XML payload without invalidating the XML structure or causing inadvertent actions by the XML due to the presence of special characters.

In illustrative embodiments, for example, in accordance with the dating principles described above, T-MSG may comprise a concatenation of timestamp 420 and the base64 encoded X-MSG. For example, with reference to FIG. 5B, an example format of T-MSG is illustrated. In the example format, the first 14 bytes or characters of the T-MSG comprises the timestamp 420 while a remaining variable number of bytes of the T-MSG comprises the encoded X-MSG. The size of the encoded X-MSG may depend, for example, on the size of the original message 422 and the compression algorithm that is used to compress the message. Any other format may be used for the T-MSG. For example, in some embodiments, no timestamp 420 may be included in the T-MSG.

As described above, each T-MSG comprises a timestamp field that includes the same timestamp 420 that is used to generate the R-KEY, S-KEY, and S-MSG. This placement allows for simple rejection of old, authentic messages that are either delivered late or, worse, are part of an unsophisticated re-play attack without significant overhead. In addition, since the same timestamp 420 is also used to generate the R-KEY and S-KEY that are in turn used in the encryption and signing of the message 422, as described above, improved security benefits may be realized through the comparison of the timestamps 420 found in the encoding against those used for encryption and signing. For example, when the timestamps 420 match, a message 422 may be deemed to be valid with respect to the timestamp. It should be noted that if the timestamp 420 itself is old or otherwise deficient, even a finding that the timestamps found in the encoding, encryption, and signing of the message 422 match may not be sufficient to deem the message 422 valid.

Figure 6A:
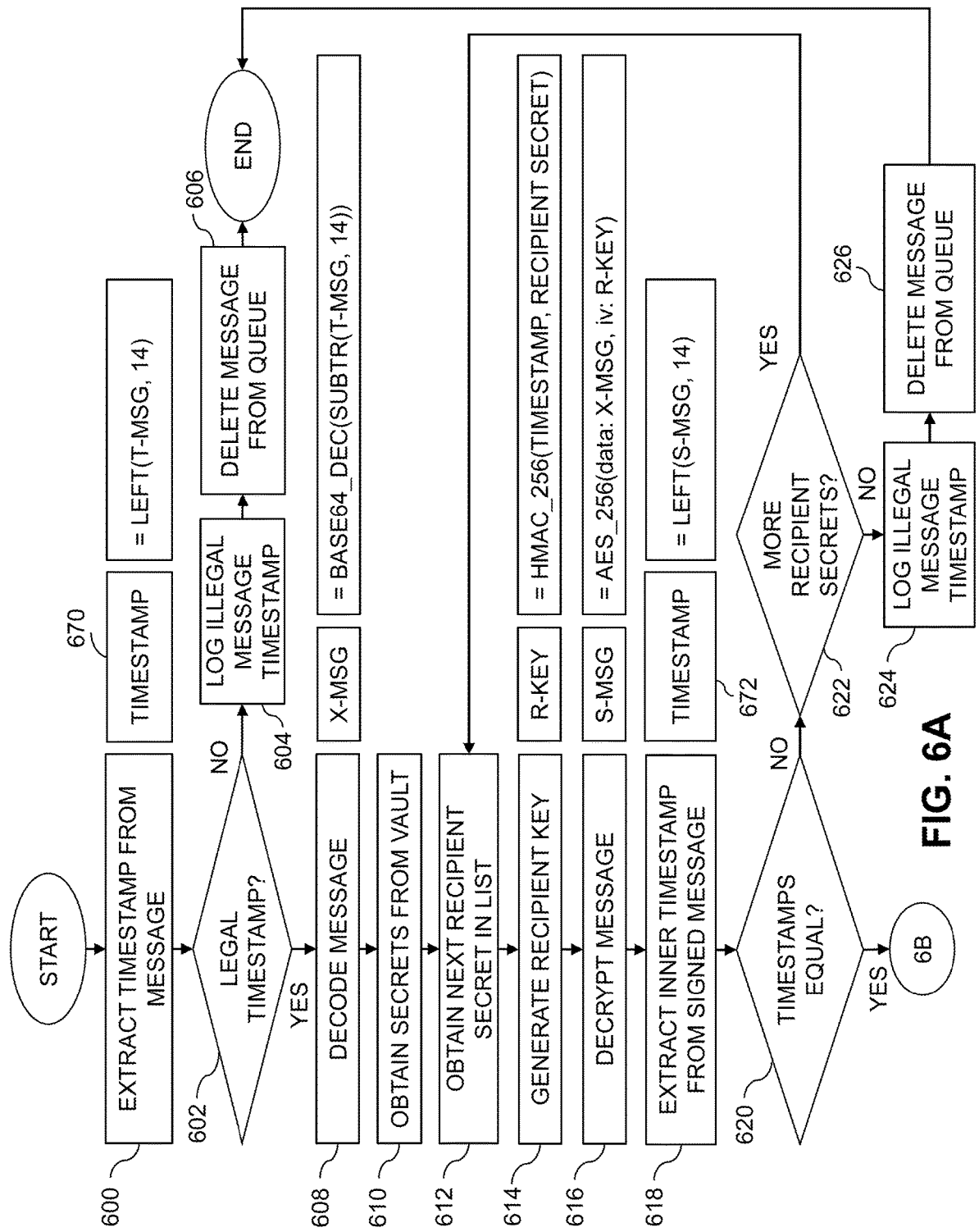
FIGS. 6A and 6B illustrate an example flow diagram for decoding, decrypting, and validating messages in an illustrative embodiment.
Figure 6B:
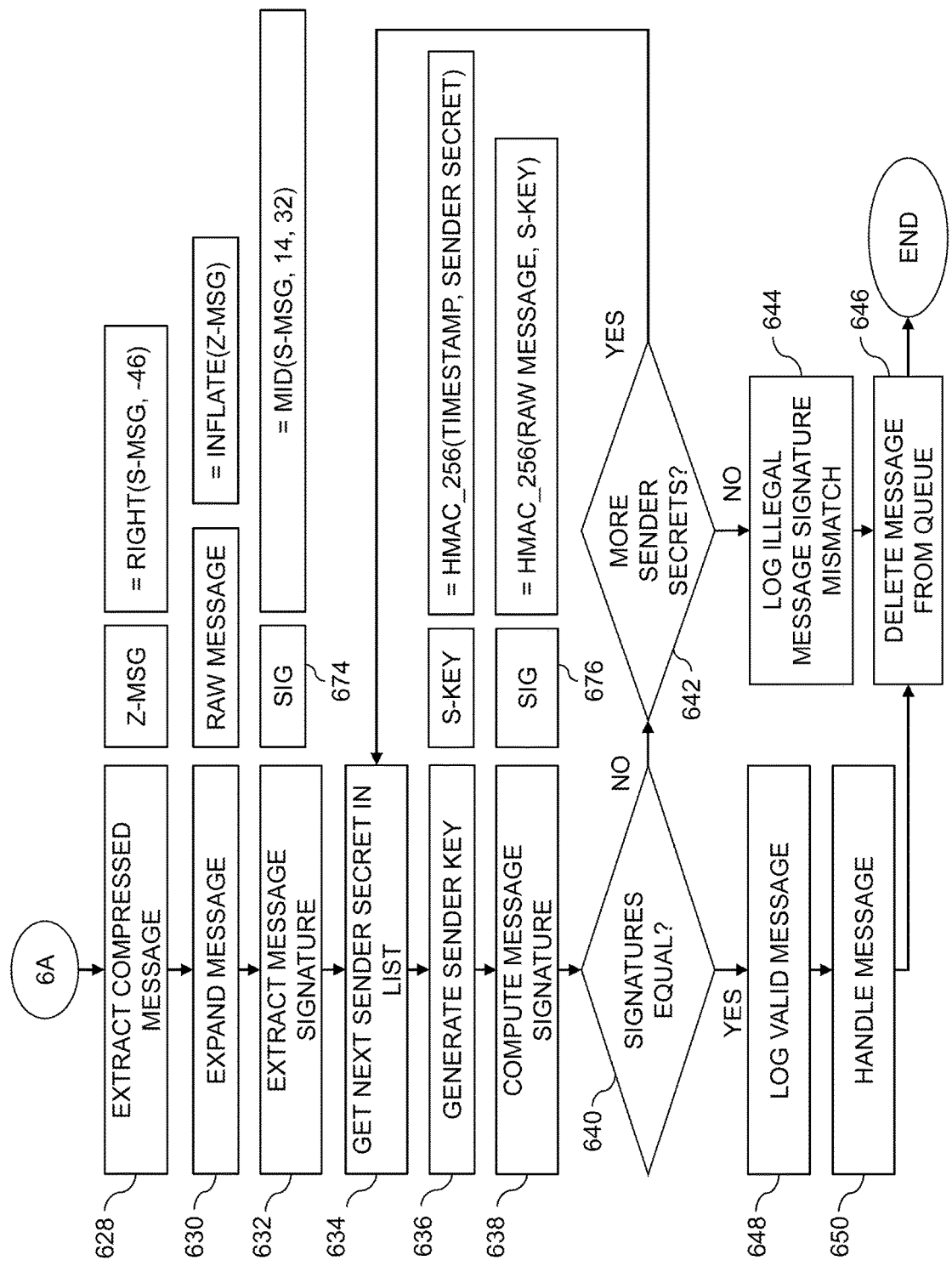

With reference now to FIGS. 6A and 6B, a decoding, decryption, and validation process of a message by a receiving entity, e.g., MCP 110 or an infrastructure controller 122, will now be described. The process as shown in FIGS. 6A and 6B includes steps 600 through 650, and is suitable for use in the system 100. It is to be understood that this particular process is only an example, and that additional or alternative processes can be carried out in other embodiments.

At 600, the receiving entity, obtains an encoded message T-MSG (e.g., a T-MSG generated at 416 of FIG. 4 by a sending entity such as MCP 110 or an infrastructure controller 122) from a queue 216 and extracts a timestamp 670 from the message. For example, the timestamp 670 may be extracted by applying a LEFT(T-MSG, 14) command to the T-MSG which extracts the first 14 bytes of the T-MSG (FIG. 5B). Any other number of bytes may be extracted depending on the format of the T-MSG and the corresponding location of the timestamp.

At 602, the receiving entity determines whether or not the timestamp 670 is a legal timestamp. For example, a timestamp 670 that issued more than a predetermined amount of time prior to the current time may be considered an illegal timestamp as the timestamp 670 may be considered to be too old. If the receiving entity determines that the timestamp 670 is illegal, it creates a log entry indicating that an illegal message timestamp was received at 604, deletes the message from the queue at 606, and the process ends.

Returning back to 602 if the receiving entity determines that the timestamp 670 is legal, the process proceeds to step 608. At 608, the receiving entity decodes the message, for example using a base64 decoder, to generate the X-MSG.

At 610, the receiving entity obtains one or more recipient secrets 424 and one or more sender secrets 426 from the vault 114, for example, in a manner similar to that described above at step 402. For example, any secrets that existed at the date and time of timestamp 670 may be obtained. In addition, if the date and time of the timestamp 670 coincides with or is near a secret rotation event in the vault 114, recipient secrets 424 and sender secrets 426 that were active both prior to and after the rotation event may be obtained.

At 612, the receiving entity obtains the next recipient secret 424 in the set of one or more recipient secrets 424 obtained at step 610.

At 614, the receiving entity generates the recipient key R-KEY in the same manner as described above for step 404 except that timestamp 670 and the recipient secret 424 obtained at step 612 are used as the inputs to the HMAC_256 algorithm.

At 616, the receiving entity decrypts the X-MSG decoded at 608 to generate the S-MSG, for example, using an AES_256 algorithm with the decoded X-MSG as the data input and R-KEY generated at step 614 as the iv input.

At 618, the receiving entity extracts the inner timestamp 672 from the decrypted S-MSG, for example by executing a LEFT(S-MSG, 14) command which obtains the first 14 bytes of the S-MSG, e.g., the timestamp 672, as shown in FIG. 5A. In other embodiments, the timestamp may comprise any other number of bytes of the S-MSG or any other portion of the S-MSG.

At 620, the receiving entity determines whether or not the inner timestamp 672 extracted at 618 is equal to the timestamp 670 extracted at step 600. If timestamps 670 and 672 are not equal, the process proceeds to step 622 and the receiving entity determines whether or not there are any remaining recipient secrets 424 of the one or more recipient secrets obtained at 610 to be checked.

If all of the obtained recipient secrets 424 have been checked, the receiving entity logs an illegal message timestamp at 624, deletes the message from the queue at 626, and the process ends.

Referring again to step 622, if there are any remaining recipient secrets 424 to be checked, the process returns to step 612 and the next recipient secret 424 is obtained from the set of one or more recipient secrets 424 obtained at 610. The process then continues to step 614 as described above.

Referring back to step 620, if the timestamps 670 and 672 are equal, the process proceeds to step 628 with reference now to FIG. 6B.

At 628, the compressed message is extracted from the S-MSG, e.g., using a RIGHT(S-MSG, −46) command which obtains the entire message after the $46^{th}$ byte position, to generate the Z-MSG. In other embodiments, any other portion of the S-MSG may comprise the compressed message and may be extracted.

At 630, the Z-MSG is expanded to generate the RAW MESSAGE, for example, using an INFLATE(Z-MSG) command which may, for example, be included as part of the deflate algorithm mentioned above. For example, the inflate command reverses the compression performed at step 410.

At 632, the message signature (SIG 674) is extracted from the S-MSG, e.g., using a MID(S-MSG, 14, 32) command, which is configured to obtain the data at bytes 14 through 32, e.g., the SIG field of the S-MSG as illustrated in FIG. 5A.

In other embodiments, the SIG 674 may be obtained from any other portion of the S-MSG, depending on the format of the S-MSG.

At 634, the receiving entity obtains the next sender secret 426 in the set of one or more sender secrets 426 obtained at step 610.

At 636, the receiving entity generates the sender key S-KEY in the same manner as described above for step 406 except that timestamp 670 and the sender secret 426 obtained at step 634 are used as the inputs to the HMAC_256 algorithm.

At 638, the receiving entity computes a message signature (SIG 676) of the RAW MESSAGE generated at step 630, e.g., using the HMAC_256 algorithm with the RAW MESSAGE generated at step 630 and the S-KEY generated at step 636 as inputs.

At 640, the receiving entity determines whether or not the SIG 674 extracted at 632 is equal to the SIG 676 computed at step 638. If SIGs 674 and 676 are not equal, the process proceeds to step 642 and the receiving entity determines whether or not there are any remaining sender secrets 426 to be checked of the sender secrets 426 obtained at 610.

If all of the obtained sender secrets 426 have been checked, the receiving entity logs an illegal message signature mismatch at 644, deletes the message from the queue at 646, and the process ends.

Referring back to step 642, if there are any remaining sender secrets 426 to be checked, the process returns to step 634 and the next sender secret 426 of the set of one or more sender secrets 426 obtained at 610 is obtained. The process then continues to step 636 as described above.

Referring back to step 640, if the SIGs 674 and 676 are equal, the process proceeds to step 648.

At 648, the receiving entity logs the message as a valid message and handles the message at 650, e.g., by taking one or more actions in response to the message, as described above. The process then proceeds to step 646 for deletion of the message from the queue as described above.

In illustrative embodiments, the timestamp 420 can also be used to assess which among the secrets 424 and 426 recently issued by the vault 114 might have been used in the above cryptographic operations to generate the T-MSG. For example, since the secrets stored in the vault 114 are routinely rotated, for example, on a period basis, randomly, or in another manner, knowledge of the timestamp 420 of the message 422 will allow the recipient of the message to narrow down which secret or subset of the secrets in the vault 114 may have been active and in use during the signing, encryption, and encoding of the message 422.

In some embodiments, a secrets field may be included in the encoded message. The secrets field, in some embodiments, comprises 12 bytes that are easily derived from each of the secrets and the timestamp, or any other number of bytes. For example, the secrets field may comprise the last 12 bytes of the output of a hash-based message authentication code (HMAC) algorithm generated based at least in part on the sender secret and receiver secret as inputs, e.g., RIGHT(HMAC(HMAC(timestamp, sender_secret), receiver_secret), 12). In some embodiments, any other bytes of the output of the HMAC algorithm may be used. For example, the first 12 bytes may be used, the middle 12 bytes may be used, a larger or smaller number of bytes may be used, or any other bytes of the output of the HMAC algorithm.

When sending a message, the message sender only has one secret pair that it would use, the most "current" secret pair that it is aware of. However, since "current" is not a shared concept between the sender and the receiver, it is possible that the receiver might have a different secret pair, e.g., due to updating its secret pair at a different time than the sender. In illustrative embodiments, the receiver can quickly determine whether or not it has the same secret pair as the sender by simply performing the same HMAC algorithm that the sender used. In the illustrative embodiment, if the last 12 bytes of the output from the HMAC algorithm performed by the receiver match the 12 bytes found in the secret field associated with the message, the receiver has the right pair of secret keys and may use those keys for processing the message. If the bytes do not match, the receiver may access the vault and retrieve updated information on the secrets as candidate secret pairs. For example, if the receiver found two sender secrets in the vault and found three receiver secrets in the vault, there would be six possible secret pairs. With the secrets field in place, the receiver would test each of the six combinations to find the one that produced the matching result. It would then use that pair to process the remainder of the message.

The secrets field provides a way for the receiver to avoid a longer decrypt, deflate, and signature cycle in favor of a shorter hash to determine that the secrets are correct.

In some embodiments, a shortened timestamp may be used for the secret field, for example, YYYYMMDD, such that the HMAC algorithm, HMAC(HMAC(YYYYMMDD, sender secret), receiver secret), may be computed daily by the receiver and sender and only needs to be re-calculated by the sender when secrets have actually changed. The change in the secrets field of the message in this embodiment would be a sentinel to the receiver to re-examine secrets.

In some embodiments, alternative algorithms to the HMAC algorithm may be used for generating the bytes of the secrets field that are not as secure as the HMAC algorithm. For example, a smaller or faster hash algorithm such as, e.g., an MD5 algorithm may be used. For example, the algorithm HASH(HASH(YYYYMMDD+sender_secret)+receiver_secret) may be used to generate the secret field, where '+' is concatenation.

The secrets field enables the decoder to quickly assess which combination of keys might have been used in situations where there are multiple candidate keys. For example, in some embodiments, the receiver comprises a dictionary, e.g., a key and value store, that is used as a key for the secret field and includes a corresponding value, e.g., the tuple or pair of actual secrets. Upon message receipt, the receiver accesses the secrets field from the message and checks to see if that key is present in its dictionary. If the key is present, it then uses the associated pair of secrets to decrypt and validate the signature on the message. If the key is not present, the receiver checks the vault for updated secrets. The receiver then performs the computation on all the known (and reasonably recent) possible secret pairs to re-build the dictionary.

In some embodiments, keeping the key checks separate simplifies the evaluation of larger combinations of keys. While this technique does introduce some risk into the system, it mitigates some technical and resource related challenges that are involved with performing longer decryptions and validations on the payload and payload signature which would otherwise be required. This allows the system to reduce the computational effort required to process a received T-MSG, decode the T-MSG into the X-MSG, decrypt the X-MSG into the S-MSG, and validate the message 422.

In illustrative embodiments, system 100 also supports and implements policy-based controls as another form of intent-based control. Policies ensure that system 100 can both conform to and adapt to business and technical requirements. In some embodiments, the fulfillment of policy-based controls is implemented in the MCP 110.

In some embodiments, the initial policy control may be stored in a vault or other publicly accessible URI. All "receivers" of messages, e.g., MCP 110 and storage controllers 122 retrieve the policy, e.g., periodically, and validate or reject messages based on the policy.

In some embodiments, MCP 110 provides an instruction to an infrastructure controller 122 such as, e.g., a pod worker 214 or tenant worker 212, to adjust or update the policy. For example, the URI in a message sent from the MCP 110 to the infrastructure controller 122, e.g., via the corresponding outbound queue $216_{OUT}$, may comprise policy-based settings to be implemented by the infrastructure controller 122 and the corresponding key values may be included as part of the data field of the message.

As an example, a policy related message submitted from MCP 110 to a PoD worker 214 may comprise a URI, method, and data. For example, the URI may comprise worker settings, the method may be POST for HTTP, and the data may comprise, e.g., {ttl: 3600, poll_interval: 15}. This example message sets a time-to-live (ttl) value of 1 hour, meaning only messages received within 1 hour of the message's time-stamp may be processed. Older messages would be rejected. The example message also adjusts the polling interval to 15 seconds so that the queue would be checked for items every 15 seconds. In response to the message, the PoD worker 214 may submit a response, e.g., via the corresponding inbound queue $216_{IN}$, including confirmation of acceptance of the new settings. For example, a response may comprise an HTTP code 200 which indicates success.

An example of a policy-based control is a policy that determines the acceptable age of a message. For example, in some embodiments, MCP 110 implements an automatic expiration of messages after a predetermined period of time has passed, e.g., a nanosecond, millisecond, second, hour, day, or any other period of time. Additional policy-based message aging protections may also be implemented by the MCP 110 in the form of a policy-based control. For example, a message aging policy seeks a balance between invalidating legitimate work, which would then need to be repeated at additional cost in system resources, and achieving a target level of security to inhibit repeat attacks.

In some embodiments, for example, the additional policy-based control may be adjustable where, for example, the predetermined period of time may be adjusted based on system related factors such as, e.g., load, throughput, latency, or other similar metrics. For example, during times when the system is under a high level of load, the time that it takes for the MCP 110 or an infrastructure controller 112 to obtain messages from the messaging interfaces 112 may be longer than when the system is not under a high level of load. Because of this, a predetermined period of time that is appropriate for a low level of system load may not be appropriate for a high level of system load since the processing of legitimate messages will be delayed which may trigger the automatic expiration before they are processed. A policy-based control may alleviate this issue by automatically adjusting the predetermined threshold, for example, based on one or more of the load, throughput, latency, or other similar metrics according to a predefined security or business policy. Such a policy-based control allows the system to function in a more efficient manner that also takes into account factors which may delay the processing of messages.

In some embodiments, the policy-based control may implement or be coupled to a machine learning (ML) algorithm that assess the security risk of an attack verses a message aging during a period of a high level of system load to determine an optimum threshold for the current state of the system that provides a sufficient level of security while allowing legitimate messages to continue processing.

For example, in some embodiments, queue times may be collected from all of the queues 216 and metrics may be generated for each queue 216 that indicates how long messages take to be received on that queue. The metrics may be fed into a ML algorithm or other analytics system to determine what policy should be used for the entire set of queues or for any individual queue or grouping of queues.

In some embodiments, the MCP 110 may also produce information such as logs or other data regarding round trip times for all major commands from initial submission to eventual HTTP "200 ok" response. These logs or other data, and the metrics derived from, them may form the basis for optimizations of the MCP 110 or for training a ML model with regard to polling intervals on certain types of commands.

In some embodiments, an ML model may be used to identify noisy queues and adjust policies to optimize total system throughput.

In some embodiments, the policies may be adjusted to alleviate system stress associated with portions of the system that are more critical to scaling operations, e.g., the queues being read by MCP 110.

Figure 7:
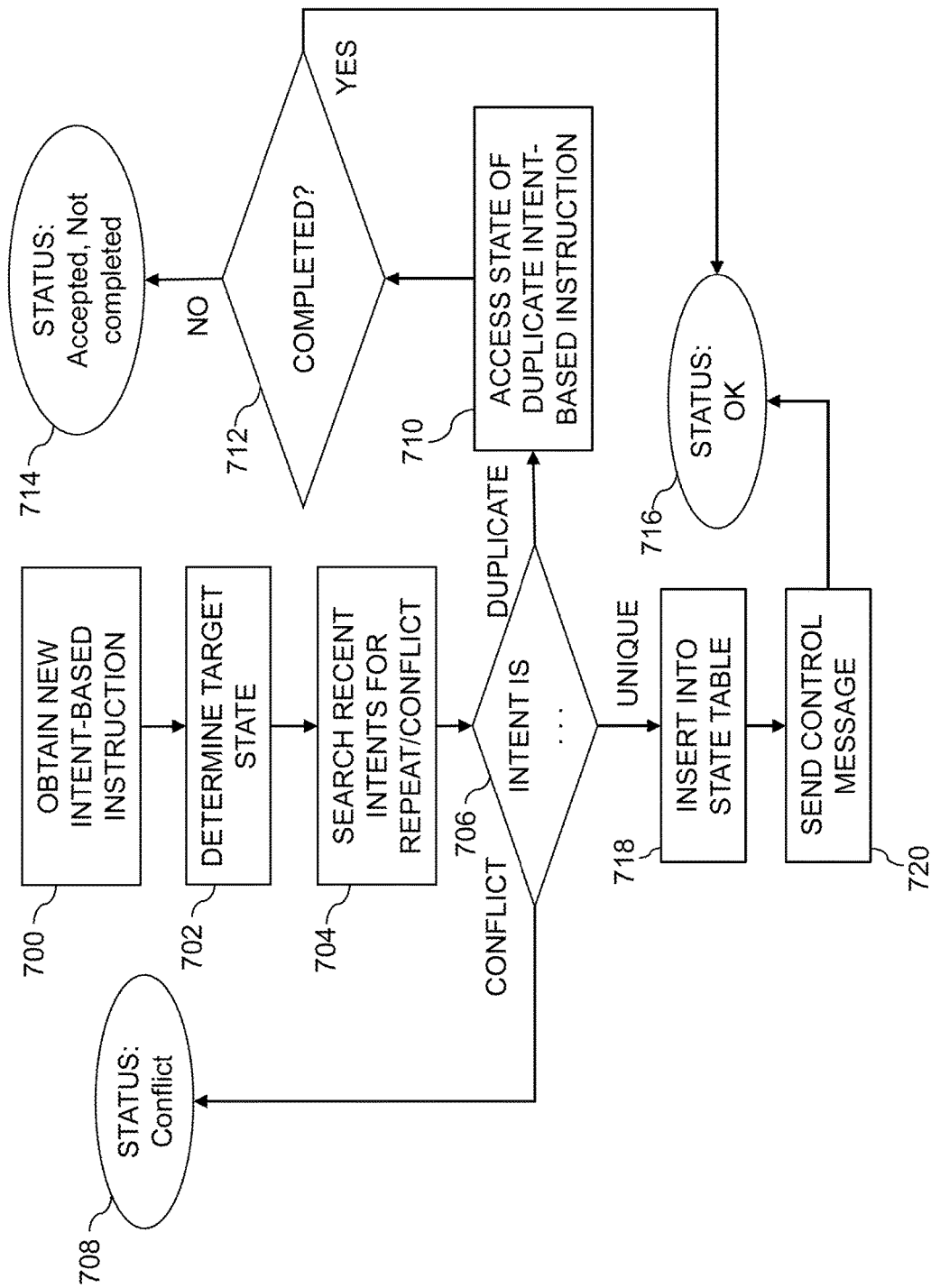
FIG. 7 is a flow diagram illustrating an example process performed by the master control plane during communication with a user device in an illustrative embodiment.

In an illustrative embodiment, an exemplary process performed by MCP 110 in conjunction with receiving an intent-based instruction from a user device 102 will now be described in more detail with reference to the flow diagram of FIG. 7. It is to be understood that this particular process is only an example, and that additional or alternative processes can be carried out in other embodiments.

In this embodiment, the process includes steps 700 through 720. These steps are assumed to be performed by MCP 110.

At 700, MCP 110 obtains a new intent-based instruction from a user device 102, e.g., via PC interface 108. For example, a user of the user device 102 may access an API associated with MCP 110 and may submit the intent-based instruction via the API.

At 702, MCP 110 determines a target state based on the obtained intent-based instruction, e.g., an instruction to power off an infrastructure component 124, remap ports for an infrastructure component 124 to VLAN or other similar target states. The intent-based instruction may, for example, comprise an indication of a target state desired by a user of the user device 102, as described above.

At 704, MCP 110 searches recent intent-based instructions for a repeat or conflicting intent-based instruction. For example, MCP 110 may access state tables 202 and determine whether an intent-based instruction for the same target state or a conflicting target state is already present in the state tables 202.

At 706, MCP 110 determines whether or not a repeating or conflicting intent-based instruction is present in the state tables 202. For example, if a prior intent-based instruction comprises an indication to achieve a power off state and the obtained intent-based instruction also comprises an indication to achieve the power off state, the obtained intent-based instruction may be considered a duplicate intent. If the prior intent-based instruction comprises an indication to achieve a power on state and the obtained intent-based instruction comprises an indication to achieve a power off state, the obtained intent-based instruction may be considered to have a conflicting intent. If no prior intent-based instruction is present in association with the target state, the obtained intent-based instruction may be considered to have no conflicting or repeating intent.

At 708, if MCP 110 determines that there is a conflicting intent-based instruction at 706, MCP 110 issues a response to the host device 102, e.g., via PC interface 108, comprising an indication that the status of the intent-based instruction is a conflict.

At 710, if MCP 110 instead determines that the obtained intent-based instruction is a duplicate intent-based instruction at 706, MCP 110 accesses the duplicate intent-based instruction in the state tables 202. In some embodiments, for example, MCP 110 may update the duplicate intent-based instruction stored in the state tables 202 or another portion of the processing platform 106 with an indication of the duplicate intent-based instruction.

At 712, MCP 110 determines whether or not the duplicate intent-based instruction has completed, for example, based on the information contained in state tables 202 that is accessed at 710. If the duplicate intent-based instruction has not completed, MCP 110 responds to the new intent-based instruction with a status indication of accepted but not yet completed, e.g., via PC interface 108, at 714. Otherwise, if the duplicate intent-based instruction has completed, MCP 110 responds to the new intent-based instruction with a status indication of OK, e.g., via PC interface 108, at 716.

Referring back to 706, if MCP 110 determines that the obtained intent-based instruction is unique, e.g., there are no prior intent-based instructions in the state tables 202 that are either a conflict or a duplicate, MCP 110 adds the obtained intent-based instruction into the state tables 202 as a new entry at 718 and sends a control message to the appropriate infrastructure controller 122 to achieve the target state, e.g., via the corresponding messaging interfaces 112, at 720.

At 720, MCP 110 responds to the new intent-based instruction with a status indication of Ok, e.g., via PC interface 108. In some embodiments, the response with the status indication of ok may be performed after MCP 110 receives confirmation from the infrastructure controller 122 that the state change has completed.

Figure 8:
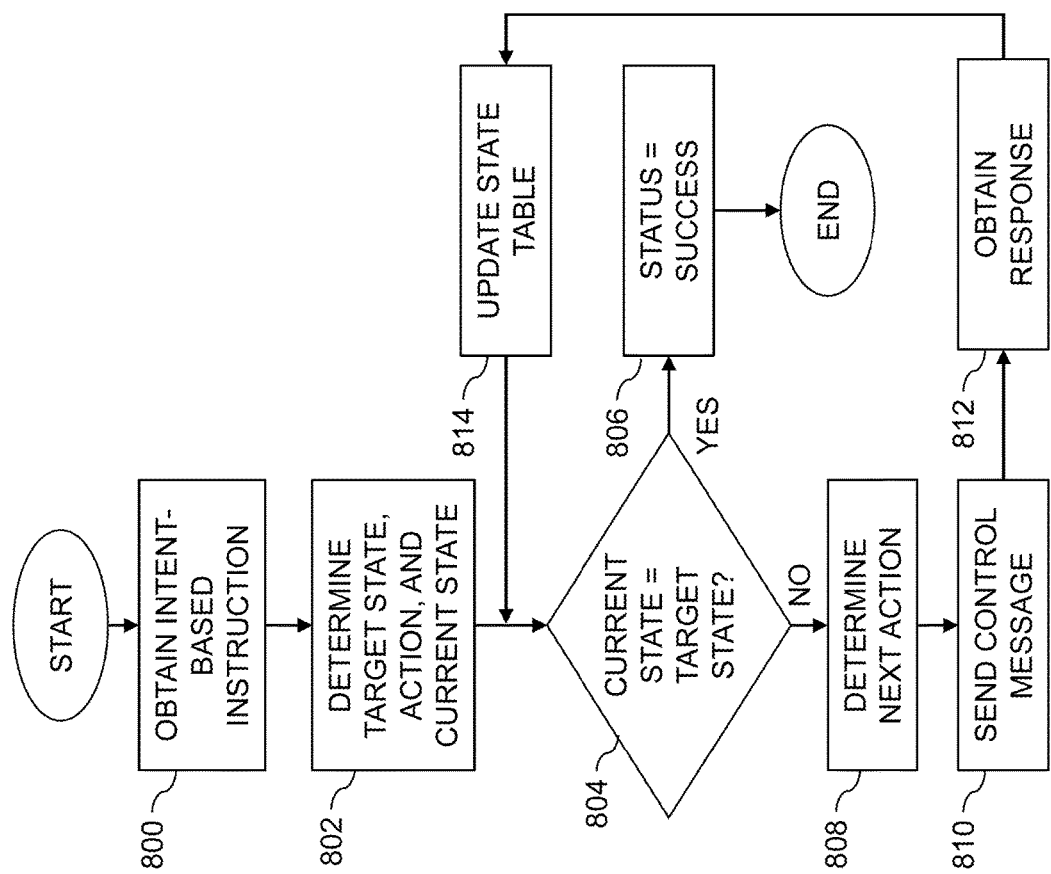
FIG. 8 is a flow diagram illustrating an example process performed by the master control plane during communication with an infrastructure controller in an illustrative embodiment.

In an illustrative embodiment, an exemplary process performed by MCP 110 in conjunction with receiving an intent-based instruction from a user device 102 will now be described in more detail with reference to the flow diagram of FIG. 8. It is to be understood that this particular process is only an example, and that additional or alternative processes can be carried out in other embodiments.

In this embodiment, the process includes steps 800 through 814. These steps are assumed to be performed by MCP 110.

At 800, MCP 110 obtains a new intent-based instruction from a user device 102, e.g., via PC interface 108.

At 802, MCP 110 determines the intended target state, action to be taken, and current state based on the intent-based instruction. For example, the intent-based instruction may comprise an indication of a target state to be achieved, e.g., power off a particular server, add more storage, etc. MCP 110 may determine an action to achieve the target state, for example, identify the appropriate infrastructure component 124 that needs to be modified or adjusted to achieve the target state and the appropriate command to send to the corresponding infrastructure controller 122. The MCP 110 may also determine the current state based on the identified infrastructure component 124 by accessing state tables 202 or obtaining the current state from the corresponding messaging interface 112 associated with the corresponding infrastructure controller 122.

At 804, MCP 110 determines whether or not the current state is equal to the target state. If MCP 110 determines that the current state is equal to the target state at 804, MCP 110 sets the status of the intent-based instruction to success at 806 and the process ends.

Referring back to 804, if the MCP 110 determines that the current state is not equal to the target state, the method proceeds to step 808.

At 808, MCP 110 determines the next action to be taken to close the gap between the current state and the target state. For example, if the current state is power on and the target state is power off, MCP 110 may determine the sequence of actions necessary to power off the appropriate infrastructure component 124 to achieve the target state. Other similar actions may be determined based on the gap between the current and target states.

At 810, MCP 110 sends a control message to the corresponding infrastructure controller 122, e.g., via the corresponding messaging interface 112 as described above, instructing the corresponding infrastructure 122 to take the appropriate actions to achieve the target state. In some embodiments, for example, the sequence of actions included in the control message may be generic actions that are agnostic of the actual underlying commands that must be performed by the infrastructure controller 122 to achieve the target state. For example, the control message may simply instruct the infrastructure controller 122 to power down the corresponding infrastructure component 124 and the infrastructure controller 122 may execute the power down by issuing one or more commands in a format specific to that infrastructure component 124 to achieve the target power off state.

At 812, MCP 110 obtains a response from the infrastructure controller 122, e.g., via the corresponding messaging interface 112, as described above, that indicates a current state of the corresponding infrastructure component 124. In some embodiments, for example, the response may simply comprise an indication of a success or failure, and MCP 110 may determine the current state based on the indication.

At 814, MCP 110 updates the state table 202 based on the received response to include the current state. The process then proceeds back to step 804 and continues processing as described above.

In an illustrative embodiment, an exemplary messaging sequence performed by system 100 in conjunction with receiving an intent-based instruction will now be described in more detail with reference to the sequence diagram of FIGS. 9A-9E. It is to be understood that this particular message sequence is only an example, and that additional or alternative message sequences can be carried out in other embodiments. The example messaging sequence shown in FIGS. 9A-9E is performed between the user device 102, PC interface 108, MCP 110, a PoD worker 214-1 and a tenant worker 212-1. As can be seen in FIGS. 9A-9E, indicators A1-A4, B1-B4, C1-C4, D1-D4, and E1-E4 are provided to indicate the continuation of the messaging sequence for each of user device 102, PC interface 108, MCP 110, a PoD worker 214-1 and a tenant worker 212-1, respectively, through FIGS. 9A-9E.

Figure 9A:
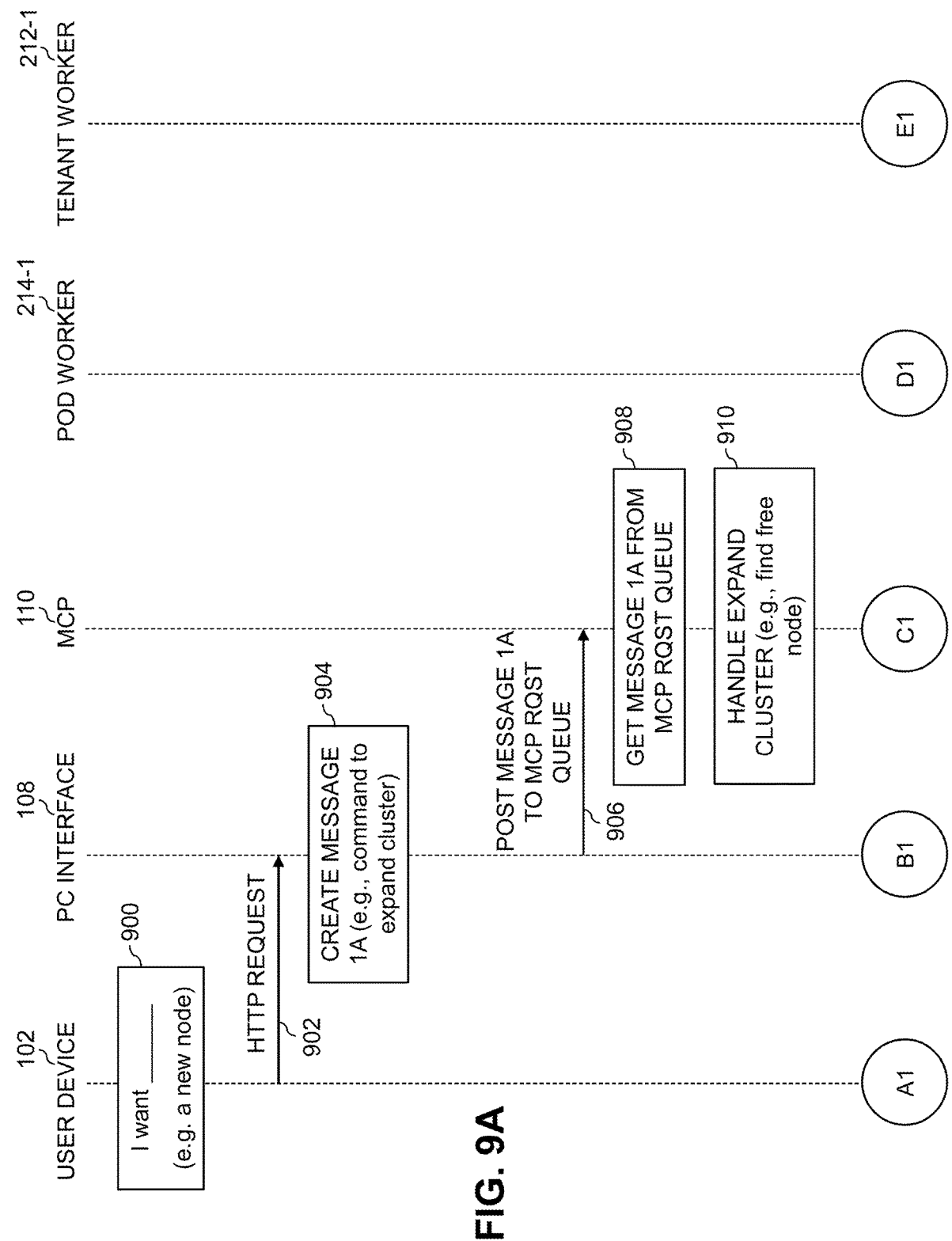
FIGS. 9A-9E are respective portions of a sequence diagram illustrating an example sequence of the system in response to receiving an intent-based instruction from a user device in an illustrative embodiment.

Referring initially to FIG. 9A, at 900, user device 102 receives an input from a user, e.g., via an input device such as a keyboard or other similar device, comprising an indication an intended target state, e.g., I want a new node.

At 902, a HTTP request is transmitted from user device 102 to PC interface 108 comprising the indication of the intended target state. In some embodiments, the user may log into an API of PC interface 108 to submit the indication of the intended target state where, for example, the HTTP request may be implemented as part of the API.

At 904, PC interface 108 generates message 1A, e.g., a command to expand a cluster, based on the user input.

At 906, PC interface 108 posts message 1A to MCP 110 via an MCP request queue of PC interface 108.

At 908, MCP 110 obtains message 1A from the MCP request queue.

At 910, MCP 110 handles the command found in message 1A by identifying corresponding actions that must be taken to achieve the target state, e.g., expand the cluster by finding a free node, adding the free node to the system, and associating the free node to the cluster. MCP 110 may also identifying any corresponding infrastructure controllers 122 that must be commanded to add the free node and associate the free node with the cluster, e.g., PoD worker 214-1 and tenant worker 212-1.

Figure 9B:
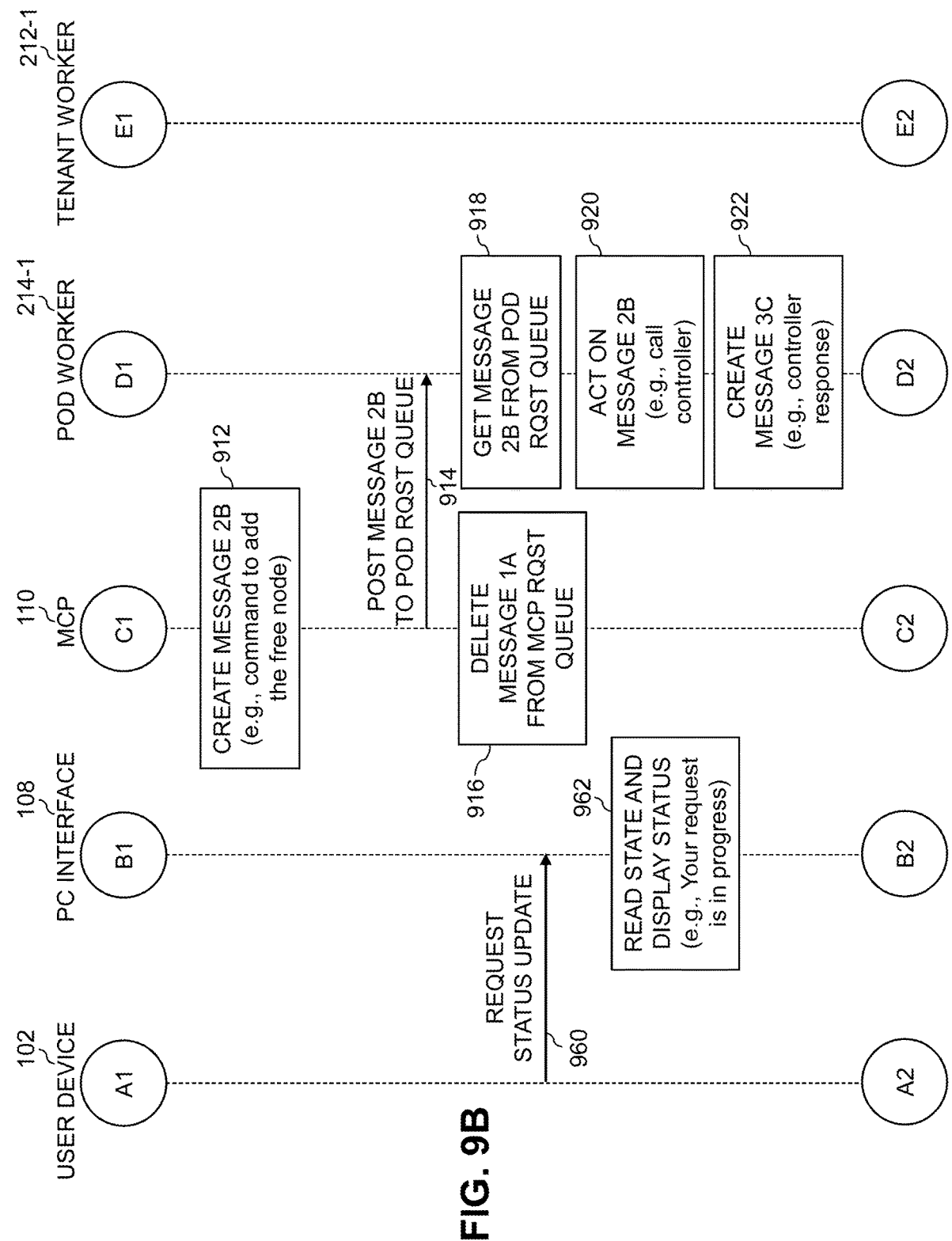

Referring now to FIG. 9B, at 912, MCP 110 creates message 2B, e.g., a command to add the free node. Message 2B may be generated as described above, for example, using dating, targeting, signing, encryption, and encoding.

At 914, MCP 110 posts message 2B to the messaging interface 112, e.g., outbound queue $216_{OUT}\text{-}P_1$, associated with the corresponding infrastructure controller 122, e.g., pod worker 214-1.

At 916, MCP 110 deletes message 1A from the MCP request queue.

At 918, in parallel with step 916, PoD worker 214-1 obtains message 2B from the outbound queue $216_{OUT}\text{-}P_1$.

At 920, PoD worker 214-1 performs one or more actions based on the command found in message 2B, for example, by invoking a corresponding controller component to add the free node.

For example, the PoD worker 214-1 may send an HTTP request to a corresponding controller component, passing the controller component data instructing it to allocate the free node to the specified tenant network space. The controller component receives the request and data from PoD worker 214-1, and performs the necessary modifications, additions, or changes to the infrastructure component 124 to implement the requested change, e.g., reconfigures switches, invokes other software to prepare the node, stands up virtual networking gear, etc. The component controller then responds to the PoD worker 214-1 with an indication of the status of the work, e.g., success, failure, or other data about the result. In illustrative embodiments, the infrastructure controller 122 comprising the PoD worker 214-1 also comprises the corresponding controller component.

At 922, PoD worker 214-1 creates a message 3C, for example, based on a response received from the controller. Message 3C may indicate whether or not the action has been achieved, e.g., adding the free node. Message 3C may be generated as described above, for example, using dating, targeting, signing, encryption, and encoding.

Figure 9C:
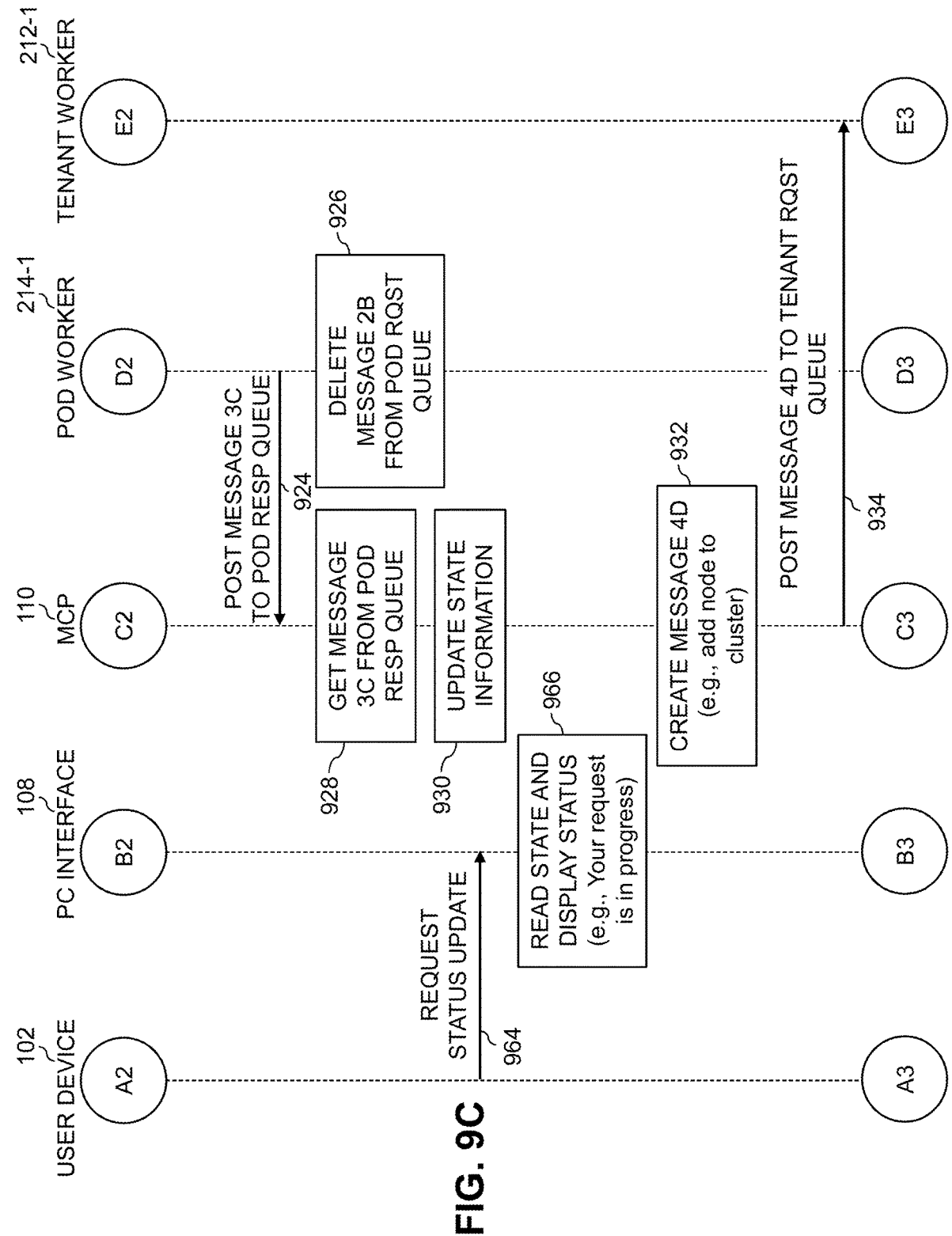

With reference now to FIG. 9C, at 924, PoD worker 214-1 posts message 3C to the inbound queue $216_{IN}\text{-}P_1$.

At 926, PoD worker 214-1 deletes message 2B from outbound queue $216_{OUT}\text{-}P_1$.

At 928, in parallel with step 926, MCP 110 obtains message 3C from the inbound queue $216_{IN}\text{-}P_1$.

At 930, MCP 110 updates the current state information based on information contained in message 3C, for example, adding an indication in state tables 202 that a free node has been added.

At 932, MCP 110 creates a message 4D, e.g., a command to associate the newly added free node to the cluster. Message 4D may be generated as described above, for example, using dating, targeting, signing, encryption, and encoding.

At 934, MCP 110 posts message 4D to the messaging interface 112, e.g., outbound queue $216_{OUT}$-1, associated with the corresponding infrastructure controller 122, e.g., tenant worker 212-1.

Figure 9D:
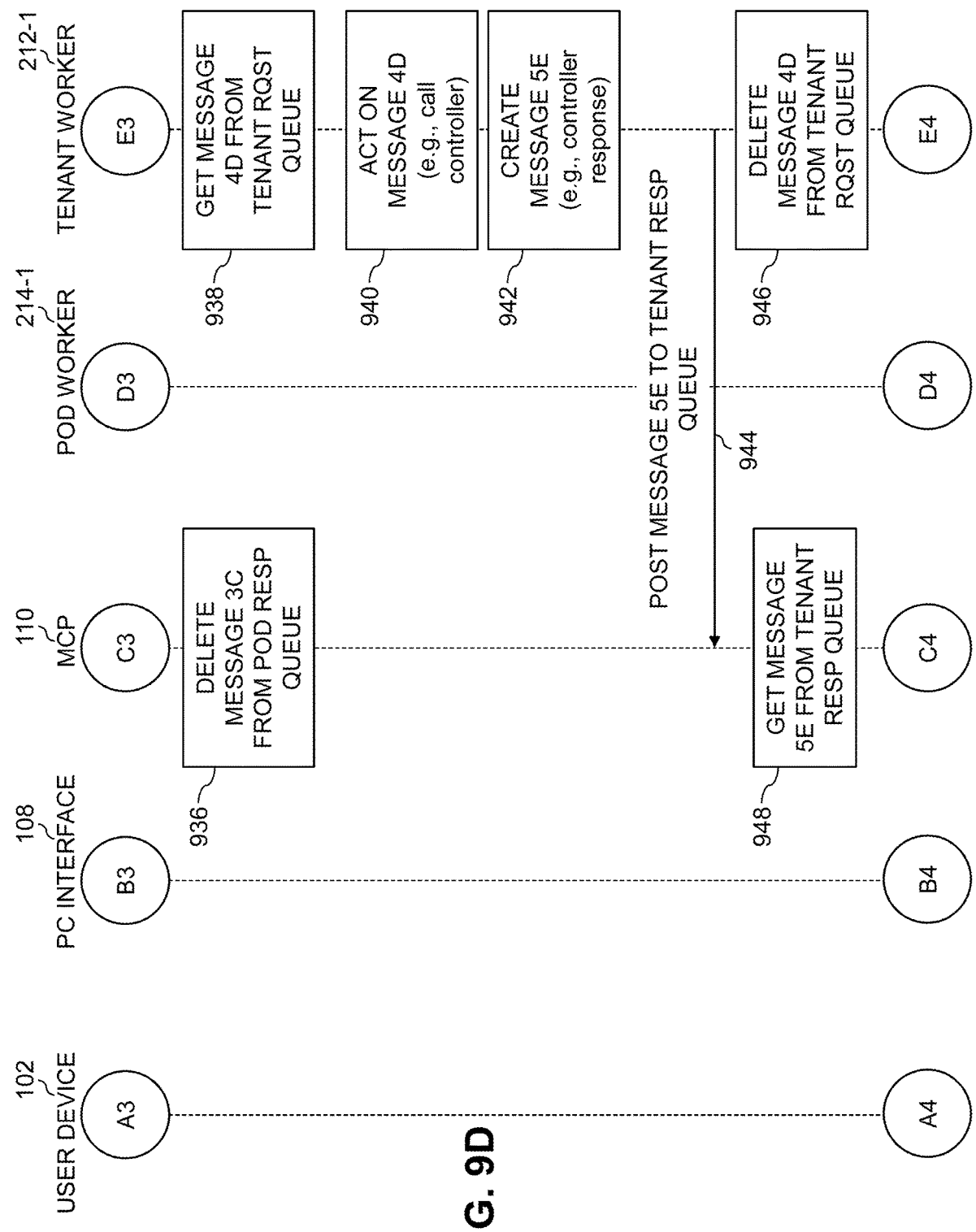

With reference now to FIG. 9D, at 936, MCP 110 deletes message 3C from the inbound queue $216_{IN}$-$P_1$.

At 938, in parallel with step 936, tenant worker 212-1 obtains message 4D from the outbound queue $216_{OUT}$-1.

At 940, tenant worker 212-1 performs one or more actions based on the command found in message 4D, for example, by invoking a corresponding controller component to associate the free node with the cluster. For example, the tenant worker 212-1 may send an HTTP request to a corresponding controller component, passing the controller component data instructing it to associate the free node with the cluster. The controller component receives the request and data from tenant worker 212-1, and performs the necessary modifications, additions, or changes to the infrastructure component 124 to implement the requested change, e.g., stand up a tenant software defined data center, etc. The component controller then responds to the tenant worker 212-1 with an indication of the status of the work, e.g., success, failure, or other data about the result. In illustrative embodiments, the infrastructure controller 122 comprising the tenant worker 212-1 also comprises the corresponding controller component.

At 942, tenant worker 212-1 creates a message 5E, for example, based on a response received from the controller. Message 5E may indicate whether or not the action has been achieved, e.g., associating the free node with the cluster. Message 5E may be generated as described above, for example, using dating, targeting, signing, encryption, and encoding.

At 944, tenant worker 212-1 posts message 5E to the inbound queue $216_{IN}$-1.

At 946, tenant worker 212-1 deletes message 4D from outbound queue $216_{OUT}$-1.

At 948, in parallel with step 946, MCP 110 obtains message 5E from the inbound queue $216_{IN}$-1.

Figure 9E:
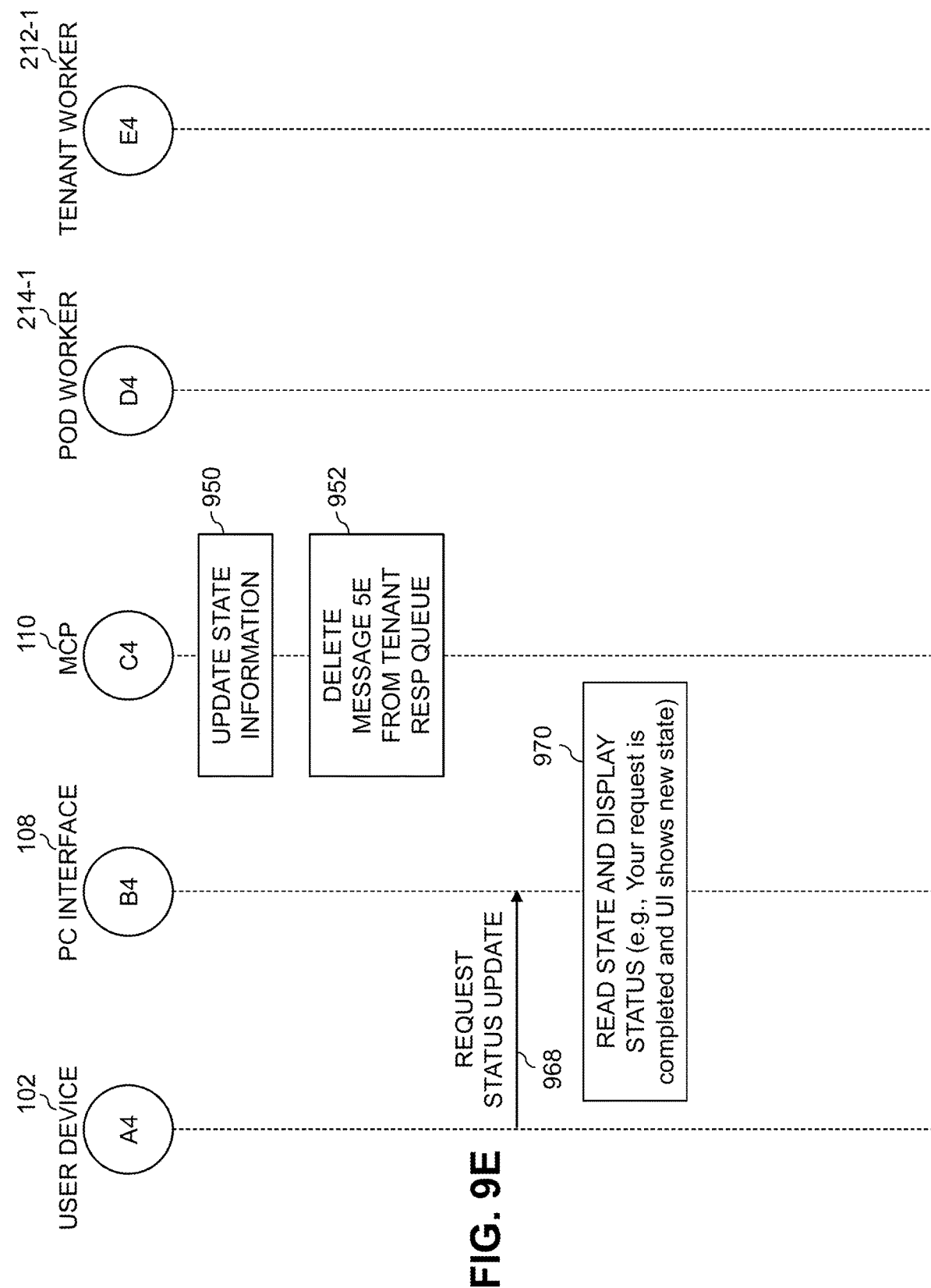

With reference now to FIG. 9E, at 950, MCP 110 updates the current state information based on information contained in message 5E, for example, adding an indication in state tables 202 that the free node has been associated with the cluster.

At 952, MCP 110 deletes message 5E from inbound queue $216_{IN}$-1.

In parallel with the above steps, user device 102 may periodically, or upon user input, request one or more status updates during the process of achieving the target state.

For example, at 960, with reference again to FIG. 9B, user device 102 may request a status update via the API of PC interface 108 in parallel with the messaging sequence described above.

At 962, PC interface 108 may read the state table 202 to determine whether the target state has been achieved and may display or otherwise present the result to the user device via the API, e.g., your request is in progress.

Likewise, at 964, with reference again to FIG. 9C, user device 102 may again request a status update via the API of PC interface 108 in parallel with the messaging sequence described above.

At 966, PC interface 108 may again read the state table 202 to determine whether the target state has been achieved and may display or otherwise present the result to the user device via the API, e.g., your request is in progress.

Finally, at 968, with reference again to FIG. 9E, user device 102 may again request a status update via the API of PC interface 108 in parallel with the messaging sequence described above.

At 970, PC interface 108 may again read the state table 202 to determine whether the target state has been achieved and may display or otherwise present the result to the user device via the API, e.g., your request is complete and the new state may be displayed in a user interface associated with the API.

The particular processing operations and other system functionality described in conjunction with the flow diagrams of FIGS. 4, 6A, 6B, 7, and 8 are presented by way of illustrative example only, and should not be construed as limiting the scope of the disclosure in any way. Alternative embodiments can use other types of processing operations involving processing platforms, host devices, and infrastructure under management. For example, the ordering of the process steps may be varied in other embodiments, or certain steps may be performed at least in part concurrently with one another rather than serially. Also, one or more of the process steps may be repeated periodically, or multiple instances of the processes can be performed in parallel with one another in order to implement a plurality of processing platform and infrastructure under management arrangements within a given information processing system.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Virtustream Enterprise Cloud, Google Cloud Platform (GCP) and Microsoft Azure. The cloud-based systems can include object stores such as Virtustream Storage Cloud, Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. For example, containers may run on physical hardware. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
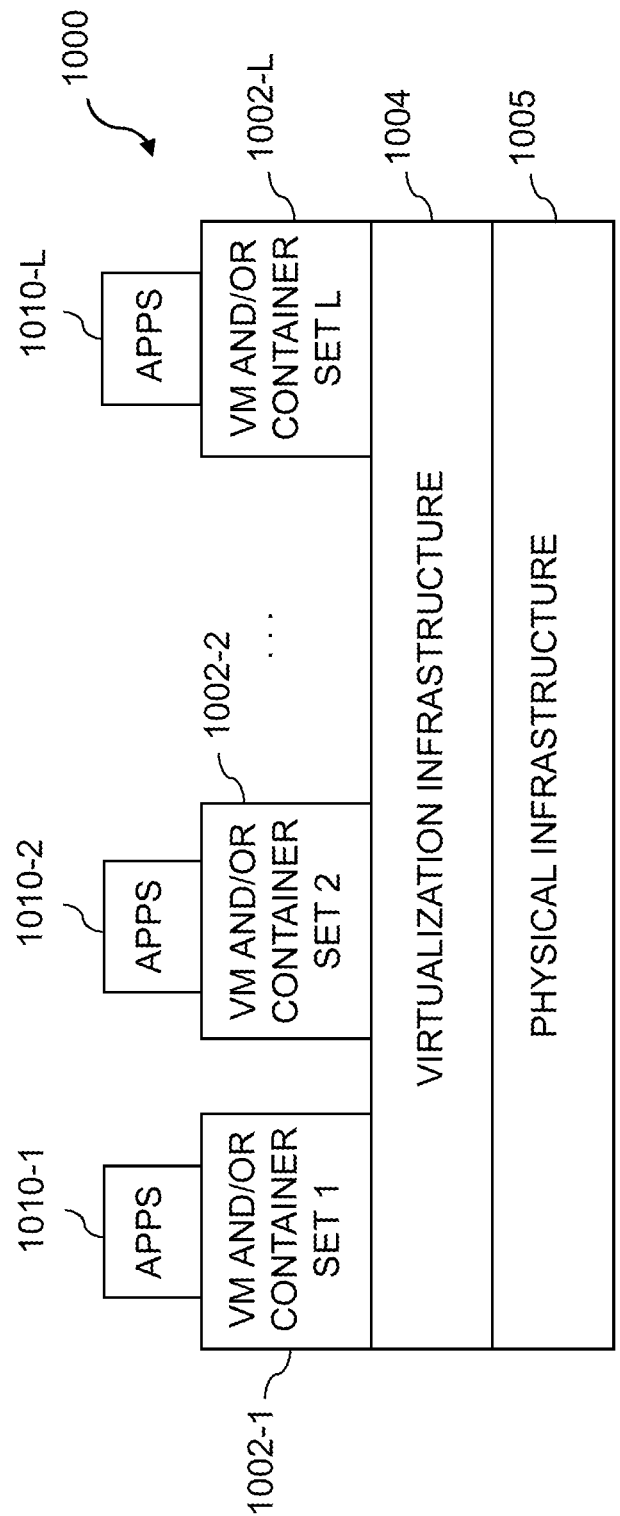
FIGS. 10 and 11 show examples of processing platforms that may be utilized to implement at least a portion of a cloud-based information processing system such as the information processing system of FIG. 1.
Figure 11:
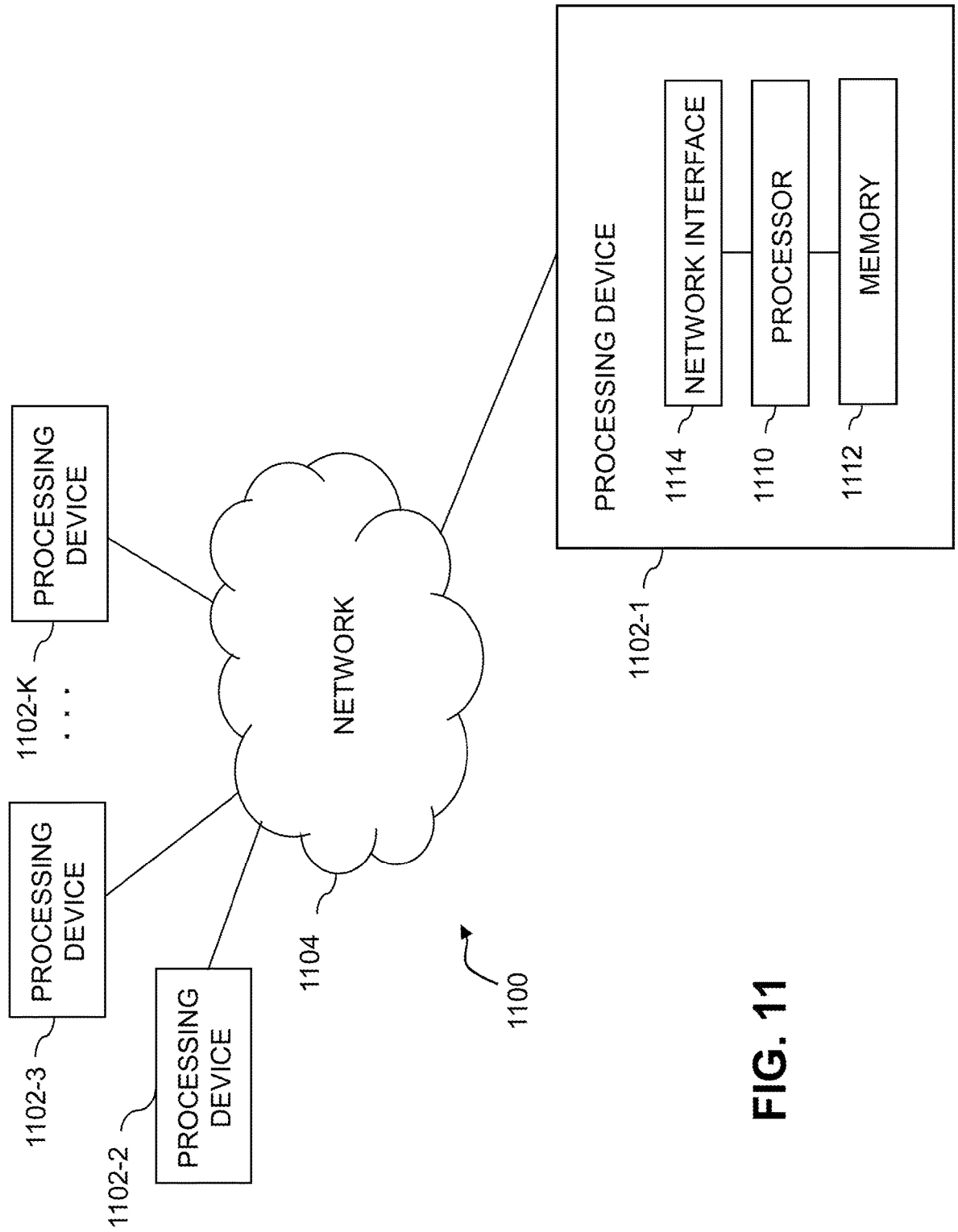

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide functionality for a centralized master control plane of the type described above for one or more processes running on a given one of the VMs. For example, each of the VMs can implement such functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide functionality for a centralized master control plane of the type described above for one or more processes running on different ones of the containers. For example, a container host device supporting multiple containers of one or more container sets can implement one or more instances of such functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, a graphics processing unit (GPU), an application-specific integrated circuit (ASIC), a field-programmable gate array (FPGA), a tensor processing unit (TPU), video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for a centralized master control plane as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, resource consumption metrics, application types, functional patterns, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a processing platform comprising a plurality of processing devices each comprising a processor coupled to a memory, the processing platform being configured to communicate with an infrastructure under management by the processing platform over a network, the infrastructure under management comprising a plurality of infrastructure controllers;
the processing platform being configured to implement a master control plane and a plurality of messaging interfaces, the master control plane being configured to communicate with each of the plurality of infrastructure controllers via the plurality of messaging interfaces of the processing platform, the plurality of infrastructure controllers each being configured to manage a corresponding one of a plurality of infrastructure components of the infrastructure under management; and
the master control plane being configured:
to store information about a plurality of target states in a target state data structure;
to obtain information about a first target state from a computing device associated with a user of the processing platform;
to compare the information about the first target state to information about a second target state of the plurality of target states that is stored in the target state data structure;
to determine that the information about the first target state is not in conflict with the information about the second target state;
to store the information about the first target state in the target state data structure;
to determine an action to be performed to achieve the first target state based at least in part on the obtained information about the first target state;
to identify a given infrastructure controller of the plurality of infrastructure controllers for performance of the determined action;
to generate an instruction comprising an indication of the determined action to be performed by the given infrastructure controller based at least in part on the obtained information about the first target state and the determination that the information about the first target state is not in conflict with the information about the second target state; and
to communicate the instruction to the given infrastructure controller of the plurality of infrastructure controllers via a corresponding messaging interface of the plurality of messaging interfaces, the given infrastructure controller being configured to modify the corresponding infrastructure component based at least in part on the communicated instruction.

2. The apparatus of claim 1 wherein each messaging interface comprises an outbound queue and an inbound queue, the instruction to the given infrastructure controller being communicated via the outbound queue of the corresponding messaging interface and wherein the master control plane is configured to receive a response to the instruction from the given infrastructure controller via the inbound queue of the corresponding messaging interface.

3. The apparatus of claim 1 wherein the master control plane is configured to obtain from the given infrastructure controller, via the corresponding messaging interface, information about a current state of the corresponding infrastructure component.

4. The apparatus of claim 3 wherein the master control plane is configured:
to determine, based at least in part on the obtained information about the current state of the corresponding infrastructure component, that the first target state has not been achieved; and
to generate at least one further instruction based at least in part on the determination that the first target state has not been achieved, the at least one further instruction comprising a second indication of at least one additional action to be performed by the given infrastructure controller on the corresponding infrastructure component;
to communicate the at least one further instruction to the given infrastructure controller via the corresponding messaging interface, the given infrastructure controller being configured to modify the corresponding infrastructure component based at least in part on the communicated at least one further instruction.

5. The apparatus of claim 1 wherein the plurality of infrastructure components comprise an infrastructure component associated with a physical portion of the infrastructure under management and a plurality of virtual infrastructure components associated with respective virtual portions of the infrastructure under management.

6. The apparatus of claim 5 wherein the plurality of infrastructure controllers comprise:
an infrastructure controller that is configured to manage the infrastructure component associated with the physical portion of the infrastructure under management; and
a plurality of additional infrastructure controllers that are configured to manage the plurality of virtual infrastructure components associated with the respective virtual portions of the infrastructure under management.

7. The apparatus of claim 1 wherein the master control plane is located at a geographically distinct location from the infrastructure under management.

8. The apparatus of claim 1 wherein the master control plane is configured:
to generate a message based at least in part on:
the instruction,
a digital signature generated based at least in part on the instruction, and
a timestamp generated in conjunction with a creation of the instruction; and
to encrypt the message,
wherein communicating the instruction to the given infrastructure controller via the corresponding messaging interface comprises communicating the encrypted message to the given infrastructure controller via the corresponding messaging interface.

9. The apparatus of claim 1 wherein the information about the first target state comprises an indication of a target number of nodes and the action to be performed to achieve the first target state comprises modifying the corresponding infrastructure component to have the target number of nodes.

10. The apparatus of claim 1 wherein:
the computing device associated with the user is a first computing device associated with a first user of the processing platform; and
the master control plane is configured:
to obtain information about a third target state from a second computing device associated with a second user of the processing platform;
to compare the information about the third target state to the information about the first target state stored in the target state data structure;
to determine that the information about the third target state is in conflict with the information about the first target state stored in the target data structure; and
to issue a message to the second computing device associated with the second user, the message indicating that the information about the third target state is in conflict with the information about the first target state.

11. The apparatus of claim 1 wherein each messaging interface has a one-to-one correspondence to a corresponding one of the plurality of infrastructure controllers of the infrastructure under management, the master control plane being configured to communicate with each of the plurality of infrastructure controllers via a corresponding one of the plurality of messaging interfaces.

12. A method comprising:
implementing a master control plane and a plurality of messaging interfaces of a processing platform, the processing platform being configured to communicate with an infrastructure under management by the processing platform over a network, the infrastructure under management comprising a plurality of infrastructure controllers, the master control plane being configured to communicate with the plurality of infrastructure controllers via the plurality of messaging interfaces of the processing platform, the plurality of infrastructure controllers each being configured to manage a corresponding one of a plurality of infrastructure components of the infrastructure under management;
storing, by the master control plane, information about a plurality of target states in a target state data structure;
obtaining, by the master control plane, information about a first target state from a computing device associated with a user of the processing platform;
comparing, by the master control plane, the information about the first target state to information about a second target state of the plurality of target states that is stored in the target state data structure;
determining, by the master control plane, that the information about the first target state is not in conflict with the information about the second target state;
storing, by the master control plane, the information about the first target state in the target state data structure;
determining, by the master control plane, an action to be performed to achieve the first target state based at least in part on the obtained information about the first target state;
identifying, by the master control plane, a given infrastructure controller of the plurality of infrastructure controllers for performance of the determined action;
generating, by the master control plane, an instruction comprising an indication of the determined action to be performed by the given infrastructure controller based at least in part on the obtained information about the first target state and the determination that the information about the first target state is not in conflict with the information about the second target state; and
communicating, by the master control plane, the instruction to the given infrastructure controller of the plurality of infrastructure controllers via a corresponding messaging interface of the plurality of messaging interfaces, the given infrastructure controller being configured to modify the corresponding infrastructure component based at least in part on the communicated instruction; and wherein the processing platform comprises a plurality of processing devices each comprising a processor coupled to a memory and the method is performed by the at least one of the processing devices.

13. The method of claim 12 wherein each messaging interface comprises an outbound queue and an inbound queue, the instruction to the given infrastructure controller being communicated via the outbound queue of the corresponding messaging interface, the method further comprising receiving, by the master control plane, a response to the instruction from the given infrastructure controller via the inbound queue of the corresponding messaging interface.

14. The method of claim 12 wherein the plurality of infrastructure components comprise an infrastructure component associated with a physical portion of the infrastructure under management and a plurality of virtual infrastructure components associated with respective virtual portions of the infrastructure under management;
wherein the plurality of infrastructure controllers comprise:
an infrastructure controller that is configured to manage the infrastructure component associated with the physical portion of the infrastructure under management; and
a plurality of additional infrastructure controllers that are configured to manage the plurality of virtual infrastructure components associated with the respective virtual portions of the infrastructure under management.

15. The method of claim 12 wherein the master control plane is located at a geographically distinct location from the infrastructure under management.

16. The method of claim 12 wherein each messaging interface has a one-to-one correspondence to a corresponding one of the plurality of infrastructure controllers of the infrastructure under management, the master control plane being configured to communicate with each of the plurality of infrastructure controllers via a corresponding one of the plurality of messaging interfaces.

17. A computer program product comprising a non-transitory processor-readable storage medium having stored therein program code of one or more software programs, wherein the program code when executed by at least one processing platform comprising a plurality of processing devices, the at least one processing platform being configured to communicate with an infrastructure under management by the at least one processing platform over a network, the infrastructure under management comprising a plurality of infrastructure controllers, causes the processing platform:
to implement a master control plane and a plurality of messaging interfaces, the master control plane being configured to communicate with each of the plurality of infrastructure controllers via the plurality of messaging interfaces of the at least one processing platform, the plurality of infrastructure controllers each being configured to manage a corresponding one of a plurality of infrastructure components of the infrastructure under management;
to store, by the master control plane, information about a plurality of target states in a target state data structure;
to obtain, by the master control plane, information about a first target state from a computing device associated with a user of the processing platform;
to compare, by the master control plane, the information about the first target state to information about a second target state of the plurality of target states that is stored in the target state data structure;
to determine, by the master control plane, that the information about the first target state is not in conflict with the information about the second target state;
to store, by the master control plane, the information about the first target state in the target state data structure;
to determine, by the master control plane, an action to be performed to achieve the first target state based at least in part on the obtained information about the first target state;
to identify, by the master control plane, a given infrastructure controller of the plurality of infrastructure controllers for performance of the determined action;
to generate, by the master control plane, an instruction comprising an indication of the determined action to be performed by the given infrastructure controller based at least in part on the obtained information about the first target state and the determination that the information about the first target state is not in conflict with the information about the second target state; and
to communicate, by the master control plane, the instruction to the given infrastructure controller of the plurality of infrastructure controllers via a corresponding messaging interface of the plurality of messaging interfaces, the given infrastructure controller being configured to modify the corresponding infrastructure component based at least in part on the communicated instruction.

18. The computer program product of claim 17 wherein each messaging interface comprises an outbound queue and an inbound queue, the instruction to the given infrastructure controller being communicated via the outbound queue of the corresponding messaging interface, wherein the program code further causes the processing platform to receive, by the master control plane, a response to the instruction from the given infrastructure controller via the inbound queue of the corresponding messaging interface.

19. The computer program product of claim 17 wherein the plurality of infrastructure components comprise an infrastructure component associated with a physical portion of the infrastructure under management and a plurality of virtual infrastructure components associated with respective virtual portions of the infrastructure under management;
wherein the plurality of infrastructure controllers comprise:
an infrastructure controller that is configured to manage the infrastructure component associated with the physical portion of the infrastructure under management; and
a plurality of additional infrastructure controllers that are configured to manage the plurality of virtual infrastructure components associated with the respective virtual portions of the infrastructure under management.

20. The computer program product of claim 17 wherein each messaging interface has a one-to-one correspondence to a corresponding one of the plurality of infrastructure controllers of the infrastructure under management, the master control plane being configured to communicate with each of the plurality of infrastructure controllers via a corresponding one of the plurality of messaging interfaces.

* * * * *